United States Patent
Kocher et al.

(10) Patent No.: US 7,787,620 B2
(45) Date of Patent: Aug. 31, 2010

(54) PREVENTION OF SIDE CHANNEL ATTACKS AGAINST BLOCK CIPHER IMPLEMENTATIONS AND OTHER CRYPTOGRAPHIC SYSTEMS

(75) Inventors: Paul C. Kocher, San Francisco, CA (US); Joshua M. Jaffe, San Francisco, CA (US); Benjamin C. Jun, Oakland, CA (US)

(73) Assignee: Cryptography Research, Inc., San Francisco, CA (US)

( * ) Notice: Subject to any disclaimer, the term of this patent is extended or adjusted under 35 U.S.C. 154(b) by 208 days.

(21) Appl. No.: 11/252,898

(22) Filed: Oct. 18, 2005

(65) Prior Publication Data

US 2006/0045264 A1  Mar. 2, 2006

Related U.S. Application Data

(63) Continuation of application No. 09/930,836, filed on Aug. 15, 2001, now Pat. No. 7,668,310, which is a continuation of application No. 09/324,798, filed on Jun. 3, 1999, now Pat. No. 6,278,783.

(60) Provisional application No. 60/087,826, filed on Jun. 3, 1998.

(51) Int. Cl.
   *H04L 9/22* (2006.01)
(52) U.S. Cl. .............................. 380/29; 380/1; 380/28; 380/46; 713/340
(58) Field of Classification Search ...................... None
   See application file for complete search history.

(56) References Cited

U.S. PATENT DOCUMENTS 1,657,411 A  2/1923  Scherbius
2,632,058 A  3/1953  Gray (Continued)

FOREIGN PATENT DOCUMENTS

DE  195 11 298 A1  3/1995

(Continued)

OTHER PUBLICATIONS

Schneier, Bruce; Applied Cryptography; John Wiley & Sons, Inc. 1996; Chapter 12.*

(Continued)

*Primary Examiner*—Jung Kim
(74) *Attorney, Agent, or Firm*—Michael A. Glenn; Glenn Patent Group

(57) ABSTRACT

Methods and apparatuses are disclosed for improving DES and other cryptographic protocols against external monitoring attacks by reducing the amount (and signal-to-noise ratio) of useful information leaked during processing. An improved DES implementation of the invention instead uses two 56-bit keys (K1 and K2) and two 64-bit plaintext messages (M1 and M2), each associated with a permutation (i.e., K1P, K2P and M1P, M2P) such that K1P{K1} XOR K2P{K2} equals the "standard" DES key K, and M1P{M1} XOR M2P{M2} equals the "standard" message. During operation of the device, the tables are preferably periodically updated, by introducing fresh entropy into the tables faster than information leaks out, so that attackers will not be able to obtain the table contents by analysis of measurements. The technique is implementable in cryptographic smartcards, tamper resistant chips, and secure processing systems of all kinds.

10 Claims, 2 Drawing Sheets

U.S. PATENT DOCUMENTS

| | | |
|---|---|---|
| 2,733,432 A | 1/1956 | Breckman |
| 3,816,762 A | 6/1974 | Holt, Jr. |
| 4,107,458 A | 8/1978 | Constant |
| 4,139,839 A | 2/1979 | Fletcher et al. |
| 4,200,770 A | 4/1980 | Hellman et al. |
| 4,202,051 A | 5/1980 | Davida et al. |
| 4,203,166 A | 5/1980 | Ehrsam et al. |
| 4,211,919 A | 7/1980 | Ugon |
| 4,214,126 A | 7/1980 | Wipff |
| 4,225,962 A | 9/1980 | Meyr et al. |
| 4,243,890 A | 1/1981 | Miller et al. |
| 4,268,898 A | 5/1981 | Brown |
| 4,295,041 A | 10/1981 | Ugon |
| 4,309,569 A | 1/1982 | Merkle |
| 4,369,332 A | 1/1983 | Campbell, Jr. |
| 4,405,829 A | 9/1983 | Rivest et al. |
| 4,563,546 A | 1/1986 | Glitz |
| 4,569,052 A | 2/1986 | Cohn et al. |
| 4,570,084 A | 2/1986 | Griffin et al. |
| 4,605,820 A | 8/1986 | Campbell, Jr. |
| 4,605,921 A | 8/1986 | Riddle et al. |
| 4,622,480 A | 11/1986 | Uchimura et al. |
| 4,661,658 A | 4/1987 | Matyas |
| 4,669,117 A | 5/1987 | Van Eck |
| 4,680,688 A | 7/1987 | Inou et al. |
| 4,686,392 A | 8/1987 | Lo |
| 4,759,063 A | 7/1988 | Chaum |
| 4,776,011 A | 10/1988 | Busby |
| 4,799,258 A | 1/1989 | Davies |
| 4,813,024 A | 3/1989 | Lismaque et al. |
| 4,905,176 A | 2/1990 | Schulz |
| 4,908,038 A | 3/1990 | Matsumura et al. |
| 4,916,333 A | 4/1990 | Kowalski |
| 4,932,053 A | 6/1990 | Fruhauf et al. |
| 4,932,057 A | 6/1990 | Kolbert |
| 4,937,649 A | 6/1990 | Shiba et al. |
| 4,937,866 A | 6/1990 | Crowther et al. |
| 4,944,007 A | 7/1990 | Austin |
| 5,017,766 A | 5/1991 | Tamada et al. |
| 5,068,894 A | 11/1991 | Hoppe |
| 5,086,467 A | 2/1992 | Malek |
| 5,136,643 A | 8/1992 | Fischer |
| 5,136,646 A | 8/1992 | Haber et al. |
| 5,144,667 A | 9/1992 | Pogue et al. |
| 5,149,992 A | 9/1992 | Allstot et al. |
| 5,157,725 A | 10/1992 | Lindholm |
| 5,159,632 A | 10/1992 | Crandall |
| 5,165,098 A | 11/1992 | Hoivik |
| 5,177,430 A | 1/1993 | Mohel |
| 5,181,243 A | 1/1993 | Saltwick et al. |
| 5,216,713 A | 6/1993 | Lindholm |
| 5,241,598 A | 8/1993 | Raith |
| 5,243,648 A | 9/1993 | Gilardi et al. |
| 5,249,294 A | 9/1993 | Griffin, III et al. |
| 5,293,029 A | 3/1994 | Iijima et al. |
| 5,297,201 A | 3/1994 | Dunlavy |
| 5,297,207 A | 3/1994 | Degele |
| 5,341,423 A | 8/1994 | Nossen |
| 5,355,413 A | 10/1994 | Ohno |
| 5,369,706 A | 11/1994 | Latka |
| 5,399,996 A | 3/1995 | Yates et al. |
| 5,401,950 A | 3/1995 | Yoshida |
| 5,402,402 A | 3/1995 | Kagami et al. |
| 5,404,402 A | 4/1995 | Sprunk |
| 5,412,379 A | 5/1995 | Warasa et al. |
| 5,412,723 A | 5/1995 | Canetti et al. |
| 5,412,730 A | 5/1995 | Jones |
| 5,414,614 A | 5/1995 | Fette et al. |
| 5,420,925 A | 5/1995 | Michaels |
| 5,428,684 A | 6/1995 | Akiyama et al. |
| 5,434,919 A | 7/1995 | Chaum |
| 5,444,288 A | 8/1995 | Jacobs |
| 5,477,039 A | 12/1995 | Lisimaque et al. |
| 5,481,555 A | 1/1996 | Wade et al. |
| 5,483,182 A | 1/1996 | Rybicki |
| 5,483,598 A | 1/1996 | Kaufman et al. |
| 5,495,098 A | 2/1996 | Pailles et al. |
| 5,506,905 A | 4/1996 | Markowski et al. |
| 5,511,123 A | 4/1996 | Adams |
| 5,514,982 A | 5/1996 | Hall et al. |
| 5,515,438 A | 5/1996 | Bennett et al. |
| 5,539,825 A | 7/1996 | Akiyama et al. |
| 5,539,827 A | 7/1996 | Liu |
| 5,544,086 A | 8/1996 | Davis et al. |
| 5,546,463 A | 8/1996 | Caputo et al. |
| 5,551,013 A | 8/1996 | Beausoleil et al. |
| 5,552,776 A | 9/1996 | Wade et al. |
| 5,557,346 A | 9/1996 | Lipner et al. |
| 5,559,887 A | 9/1996 | Davis et al. |
| 5,559,890 A | 9/1996 | Obermeire et al. |
| 5,572,112 A | 11/1996 | Saeki et al. |
| 5,600,273 A | 2/1997 | Hall et al. |
| 5,600,324 A | 2/1997 | Reed et al. |
| 5,602,917 A | 2/1997 | Mueller |
| 5,608,614 A | 3/1997 | Ohnishi et al. |
| 5,623,548 A | 4/1997 | Aikyama et al. |
| 5,625,692 A | 4/1997 | Herzberg et al. |
| 5,625,695 A | 4/1997 | M'Hraihi et al. |
| 5,631,492 A | 5/1997 | Ramus et al. |
| 5,633,930 A | 5/1997 | Davis et al. |
| 5,636,157 A | 6/1997 | Hesson et al. |
| 5,638,444 A | 6/1997 | Chou et al. |
| 5,663,896 A | 9/1997 | Aucsmith |
| 5,664,017 A | 9/1997 | Gressel et al. |
| 5,668,877 A | 9/1997 | Aziz |
| 5,670,934 A | 9/1997 | Ina et al. |
| 5,696,827 A | 12/1997 | Brands |
| 5,703,413 A | 12/1997 | Trehame |
| 5,710,834 A | 1/1998 | Rhoads |
| 5,727,062 A | 3/1998 | Ritter |
| 5,727,063 A | 3/1998 | Aiello et al. |
| 5,733,047 A | 3/1998 | Furuta et al. |
| 5,737,419 A | 4/1998 | Ganesan |
| 5,745,577 A | 4/1998 | Leech |
| 5,761,306 A | 6/1998 | Lewis |
| 5,764,766 A | 6/1998 | Spratte |
| 5,778,065 A | 7/1998 | Hauser et al. |
| 5,778,069 A | 7/1998 | Thomlinson et al. |
| 5,778,074 A | 7/1998 | Garcken et al. |
| 5,796,836 A | 8/1998 | Markham |
| 5,812,669 A | 9/1998 | Jenkins et al. |
| 5,821,775 A | 10/1998 | Mehta et al. |
| 5,835,599 A | 11/1998 | Buer |
| 5,838,795 A | 11/1998 | Mittenthal |
| 5,848,159 A | 12/1998 | Collins et al. |
| 5,859,548 A | 1/1999 | Kong |
| 5,870,478 A | 2/1999 | Kawamura |
| 5,892,829 A | 4/1999 | Aiello et al. |
| 5,905,399 A | 5/1999 | Bosnyak et al. |
| 5,907,832 A | 5/1999 | Pieterse et al. |
| 5,914,471 A | 6/1999 | Van De Pavert |
| 5,917,168 A | 6/1999 | Nakamura et al. |
| 5,917,754 A | 6/1999 | Pathak et al. |
| 5,944,833 A | 8/1999 | Ugon |
| 5,946,397 A | 8/1999 | M'Raihi et al. |
| 5,982,900 A | 11/1999 | Ebihara et al. |
| 5,991,415 A | 11/1999 | Shamir |
| 5,994,917 A | 11/1999 | Wuidart |
| 5,995,624 A | 11/1999 | Fielder et al. |
| 5,995,629 A | 11/1999 | Reiner |
| 5,998,978 A | 12/1999 | Connell et al. |
| 6,009,174 A | 12/1999 | Tatebayashi et al. |
| 6,018,717 A | 1/2000 | Lee et al. |
| 6,028,454 A | 2/2000 | Elmasry et al. |

| | | | |
|---|---|---|---|
| 6,031,912 A | 2/2000 | Moulart et al. | |
| 6,041,122 A | 3/2000 | Graunke et al. | |
| 6,041,412 A | 3/2000 | Timson et al. | |
| 6,046,608 A | 4/2000 | Theogarajan | |
| 6,047,068 A | 4/2000 | Rhelimi et al. | |
| 6,049,613 A | 4/2000 | Jakobsson | |
| 6,064,724 A | 5/2000 | Kelly | |
| 6,064,740 A | 5/2000 | Curiger et al. | |
| 6,066,965 A | 5/2000 | Blomgren et al. | |
| 6,069,497 A | 5/2000 | Blomgren et al. | |
| 6,069,954 A | 5/2000 | Moreau | |
| 6,070,795 A | 6/2000 | Feiken | |
| 6,075,865 A | 6/2000 | Scheidt et al. | |
| 6,078,663 A | 6/2000 | Yamamoto | |
| 6,090,153 A | 7/2000 | Chen et al. | |
| 6,101,477 A | 8/2000 | Hohle et al. | |
| 6,107,835 A | 8/2000 | Blomgren et al. | |
| 6,115,601 A | 9/2000 | Ferreira | |
| 6,128,391 A | 10/2000 | Denno et al. | |
| 6,181,596 B1 | 1/2001 | Horne et al. | |
| 6,185,596 B1 | 2/2001 | Hadad et al. | |
| 6,185,685 B1 | 2/2001 | Morgan et al. | |
| 6,211,456 B1 | 4/2001 | Seningen et al. | |
| 6,222,923 B1 | 4/2001 | Schwenk | |
| 6,226,750 B1 | 5/2001 | Trieger | |
| 6,236,981 B1 | 5/2001 | Hill | |
| 6,247,129 B1 | 6/2001 | Keathley et al. | |
| 6,278,783 B1 | 8/2001 | Kocher et al. | |
| 6,289,455 B1 | 9/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,336,188 B2 | 1/2002 | Blake-Wilson et al. | |
| 6,345,359 B1 | 2/2002 | Bianco | |
| 6,381,699 B2 | 4/2002 | Kocher et al. | |
| 6,393,567 B1 | 5/2002 | Colnot | |
| 6,434,238 B1 | 8/2002 | Chaum et al. | |
| 6,442,525 B1 | 8/2002 | Silverbrook et al. | |
| 6,448,981 B1 | 9/2002 | Kaczmarski | |
| 6,453,296 B1 | 9/2002 | Iwamura | |
| 6,510,518 B1 | 1/2003 | Jaffe et al. | |
| 6,539,092 B1 | 3/2003 | Kocher | |
| 6,654,884 B2 | 11/2003 | Jaffe et al. | |
| 6,690,795 B1 | 2/2004 | Richards | |
| 6,698,662 B1 | 3/2004 | Feyt et al. | |
| 6,748,410 B1 | 6/2004 | Gressel et al. | |
| 7,073,072 B1 | 7/2006 | Salle | |
| 2001/0016908 A1 | 8/2001 | Blake-Wilson et al. | |
| 2001/0053220 A1 | 12/2001 | Kocher et al. | |
| 2002/0118190 A1 | 8/2002 | Greasley | |
| 2002/0124178 A1 | 9/2002 | Kocher et al. | |
| 2003/0028771 A1 | 2/2003 | Kocher et al. | |
| 2003/0188158 A1 | 10/2003 | Kocher | |
| 2008/0022146 A1 | 1/2008 | Kocher et al. | |
| 2008/0059826 A1 | 3/2008 | Kocher et al. | |

FOREIGN PATENT DOCUMENTS

| | | |
|---|---|---|
| EP | 0 240 328 A2 | 10/1987 |
| EP | 0304733 A1 | 3/1989 |
| EP | 0 452 031 A2 | 10/1991 |
| EP | 0529261 A2 | 3/1993 |
| EP | 0 563 912 A1 | 10/1993 |
| EP | 0 424 415 B1 | 2/1994 |
| EP | 0399587 A1 | 2/1994 |
| EP | 0582395 A2 | 2/1994 |
| EP | 0656708 A1 | 6/1995 |
| EP | 0660562 A2 | 6/1995 |
| EP | 0 790 547 A1 | 8/1997 |
| EP | 0826169 B1 | 12/1997 |
| EP | 1064752 B1 | 9/1999 |
| EP | 1204948 B1 | 1/2001 |
| EP | 0 826 169 B1 | 11/2002 |
| EP | 1 080 400 B1 | 11/2002 |
| EP | 1 062 633 B1 | 12/2003 |
| FR | 2738970 A1 | 3/1997 |
| FR | 2738971 A1 | 3/1997 |
| JP | 60-146361 | 8/1985 |
| JP | 62-082702 | 4/1987 |
| JP | 62-166489 | 7/1987 |
| JP | 62-260406 | 11/1987 |
| JP | 64-081087 | 3/1989 |
| JP | 02-187888 | 7/1990 |
| JP | 05-094458 | 4/1993 |
| JP | 09-163469 | 6/1997 |
| JP | 10-084223 | 3/1998 |
| JP | 10-171717 | 6/1998 |
| JP | 10-197610 | 7/1998 |
| WO | WO 97/13342 | 4/1997 |
| WO | WO 97/14085 | 4/1997 |
| WO | WO 97/14086 | 4/1997 |
| WO | WO 97/33217 A1 | 9/1997 |
| WO | WO 98/52319 | 11/1998 |
| WO | WO 99/08411 | 2/1999 |
| WO | WO 99/49416 A1 | 9/1999 |
| WO | WO 99/63419 A1 | 12/1999 |

OTHER PUBLICATIONS

Hevia et al. "Strength of Two Data Encryption Standard Implementations under Timing Attacks" Proceedings of the 3$^{rd}$ Latin American Symposium on Theoretical Informatics, Campinas, Brazil, Apr. 1998.*

Biham et al. "Differential Fault Analysis of Secret Key Cryptosystems" Advances in Cryptology, Springer-Verlag Berlin Heidelberg 1997.*

"R_ Random.C—random objects for RSAREF" RSA Data Security, Inc., created 1991, U.S.A.

"Security Requirements for Cryptographic Modules", Federal Information Processing Standards Publication (FIPS PUB) 140-1, U.S. Department of Commerce, National Institute of Standards and Technology, Jan. 1994.

Bellare et al., "Incremental Cryptography: The Case of Hashing and Signing" in: Desmedt, Y., Advances in Cryptology-Crypto 91 Proceedings, (Berlin, Germany, Springer, 1994), pp. 216-233.

Kocher, "Timing Attacks on Implementations of Diffie-Hellman, RSA, DSS and Other Systems", in: Koblitz, N., Advances in Cryptography—Crypto '96 (Berlin, Springer, 1996), pp. 104-113.

Krawczyk et al., "HMAC: Keyed-Hashing for Message Authentication", Network Working Group Request for Comments.

Menezes et al., "Handbook of Applied Cryptography" (CRC Press, 1996), pages including 285-298, 312-319, 452-462, 475, 515-524, Boca Raton, New York, London and Tokyo.

Ryan, J., "Blinds for Thermodynamic Cipher Attacks"< unpublished material on the World Wide Web at http://cybertrace.com/thrmatak.html, Mar. 1996.

Schneier, Bruce, "Applied Cryptography, Second Edition: Protocols, Algorithms, and Source Code in C", Oct. 18, 1995, pp. 34-41, 480-481, John Wiley & Sons, Inc., New York, Chichester, Brisbane, Toronto and Singapore.

Bank Technology News, "Cries of Wolf Over Smart Card Security?", Faulkner & Gray, Inc., Nov. 1, 1996.

"Data Encryption Standard", Federal Information Processing Standards Publication (FIPS PUB) 46-2, U.S. Department of Commerce, National Institute of Standards and Technology, Dec. 30, 1993.

Biham et al., "Differential Fault Analysis of Secret Key Cryptosystems", in Advances in Cryptology-CRYPTO '97 (Berlin, Germany, Springer, 1997), 17$^{th}$ Annual Intl. Cryptology Conference, Aug. 17-21, 1997.

Based on "Karn/Hoey/Outerbridge" implementations (KHODES): File DESC.C from RSAREF—Data Encryption Standard Routines for RSAREF.

American National Standard for Financial Services, secretariat—American Bankers Associate (ANS/ABA x9.24-1997), "Financial Services Key Management", approved Apr. 6, 1992, American National Standards Institute, pp. 1-71, Apr. 6, 1992.

Jueneman, Robert, "Analysis of Certain Aspects of Output Feedback Mode", Satellite Business Systems, 1998, pp. 99-127, McLean, VA.

Bauer, Friedrich, "Cryptology—Methods and Maxims", Technical University Munich, Germany, 1998, pp. 31-48.

Connor, Doug (Technical Editor), "Cryptographic Techniques—Secure Your Wireless Designs", Jan. 18, 1996, pp. 57-68, EDN.

Hornauer et al., "Markov Ciphers and Alternating Groups", Eurocrypt 91, 1991, pp. 453-460, Springer-Verlag.

Koblitz, "A Course in Number Theory and Cryptography", 2e, 1994, Chapter III, pp. 54-77, Springer-Verlag, New York.

Lai et al., "Markov Ciphers and Differential Cryptanalysis". Institute for Signal and Information Processing Swiss Federal Institute of Technology, Zurich, CH, 1998, Springer-Vetlag, pp. 17-38.

Hachez et al., "Timing Attack: What Can Be Achieved by a Powerful Adversary?", 1999, UCL Crypto Croup, Belgium.

Kocher, Paul, "Cryptanalysis of Diffie-Hellman, RSA, DSS, and Other Systems Using Timing Attacks", Report Dec. 7, 1995, pp. 1-6, U.S.A.

Kaliski, Burt, "Timing Attacks on Cryptosystems", RSA Laboratories, Bulletin, No. 2, Jan. 23, 1996, U.S.A.

Lacy et al., "CryptoLib Version 1.1", File Bigpow.c from CryptoLib, United States, Nov. 1999.

"File NN.C from RSAFEF", RSA Laboratories, a division of RSA Data Security, Inc., United States, 1991.

Wayner, P., "Code Breaker Crack Smart Cards, Digital Safe", New York Times, United States, Jun. 22, 1998, on the World Wide Web at : http://www.nytimes.com/library/tech/98/06/biztech/articles/22card.html.

Posting on sci.crypt newsgroup, Back, Adam, "Non-Interactive Forward Secrecy", Sep. 6, 1996, Google Beta Groups.

Posting on sci.crypt newsgroup, Bell, Jim, "Spread-Spectrum Computer Clock?" Google Beta Groups.

Bellare et al., "Optimal Asymmetric Encryption", Advanced Networking Laboratories, 1998, pp. 92-111, Springer-Verlag, U.S.A.

Bellare et al, "The Exact Security of Digital Signatures—How to Sign with RSA and Rabin", Advances in Cryptology—Eurocrypt 96 Proceedings, Lecture Notes in Computer Science, vol. 1070, , pp. 1-16, U. Maurer ed., Springer-Verlag, 1996.

Bellare et al, "Forward Integrity For Secure Audit Logs", pp. 1-16, Nov. 23, 1997, U.S.A.

Frankel et al., "Optimal-Resilience Proactive Public-Key Cryptosystems" IEEE Symposium on Foundations of Computer Science, 1997.

Frankel et al., "Proactive RSA", Lecture Notes in Computer Science, 1996.

Herzberg et al, "Proactive Public Key and Signature Systems", ACM Conference on Computer and Communications Security, 1996.

Menzes et al, "Pseudorandom Bits and Sequences", Handbook of Applied Cryptography, CRC Press, Chapter 5, pp. 169-190, 1996.

Menzes et al, "Efficient Implementation", Handbook of Applied Cryptography, CRC Press, Chapter 14, pp. 591-634, 1996.

Posting on sci.crypt newsgroup, Rivest, Ronald, "Timing Cryptanalysis of RSA, DH, DDS" Google Beta Groups.

Posting on sci.crypt newsgroup, Rivest, Ron, "Announce: Timing cryptanalysis of RSA, DH, DSS", Dec. 11, 1995, retrieved from internet Nov. 19, 2005, http://groups.google.com/group/sci.crypt/msg/79e75dc930adf?dmode=source&hl=en.

Posting on sci.crypt newsgroup, Kocher, Paul C, "Announce: Timing cryptanalysis of RSA, DH, DSS", Dec. 11, 1995, retrieved from internet Nov. 19, 2005, http://groups.google.com/group/sci.crypt/msg/027dadba758893a5?dmode=source& hl=en.

Posting on sci.crypt newsgroup, Walters, Jim, "Announce: Timing cryptanalysis of RSA, DH, DSS", Dec. 11, 1995, retrieved from internet Nov. 19, 2005, http://groups.google.com/group/sci.crypt/msg/77b761989c18baea?dmode=source&hl=en.

Posting on sci.crypt newsgroup, Kocher, Paul C, "Announce: Timing cryptanalysis of RSA, DH, DSS", Dec. 12, 1995, retrieved from internet Nov. 22, 2005, http://groups. google.com/group/sci.crypt/msg/769112d9a7 a17488?dmode=source&hl=en.

Posting on sci.crypt newsgroup, Rubin, Paul, "Announce: Timing cryptanalysis of RSA, DH, DSS", Dec. 12, 1995, retrieved from internet Nov. 22, 2005, http://groups.google.com/group/sci.crypt/msg/7c8fva520b1b5482?dmode=source&hl=en.

Posting on sci.crypt newsgroup, Brown, Ralf, "Announce: Timing cryptanalysis of RSA, DH, DSS", Dec. 12, 1995, retrieved from internet Nov. 22, 2005, http://groups.google.com/group/sci.crypt/msg/417b42c49fe7cf53?dmode=source& h1=en.

Posting on sci.crypt newsgroup, Stewart, Bill, "Announce: Timing cryptanalysis of RSA, DH, DSS", Dec. 13, 1995, retrieved from internet Nov. 22, 2005, http://groups.google.com/group/sci.crypt/msg/7610aea60249ed48?dmode=source&hl=en.

Posting on sci.crypt newsgroup, Larry, "Announce: Timing cryptanalysis of RSA, DH, DSS", Dec. 15, 1995, retrieved from internet Nov. 22, 2005, http://groups.google.com/group/sci.crypt/msg/ced8289a35a32925?dmode=source& hl=en.

Posting on sci.crypt newsgroup, Costa, Bob, "Re: Attacking machines on the Internet (re: Timing cryptanalysis of RSA, DH, DSS)", Dec. 16, 1995. retrieved from internet Nov. 22, 2005, http://groups.google.com/group/sci.crypt/msg/350820497cce62ba?dmode=source&hl=en.

Posting on sci.crypt newsgroup, Perry, Tom, "Announce: Timing cryptanalysis of RSA, DH, DSS", Dec. 17, 1995, retrieved from internet Nov. 22, 2005, http://groups.google.com/group/sci.crypt/msg/20e43912653f9bd0?dmode=source& hl=en.

Posting on sci.crypt newsgroup, Bell, Jim, "Spread-Spectrum computer clock?", Dec. 24, 1995, retrieved from internet Nov. 22, 2005, http://groups.google.com/group/sci.crypt/msg/485abca33cc29703?dmode=source& hl=en.

Posting on mail.cypherpunks, Brandt, Eli, "Re: Timing Attacks", Dec. 11, 1995, retrieved from internet Dec. 7, 2005, http://groups.google.com/group/mail.cypherpunks/msg/fa276adeb23f2b83?dmode= source.

Posting on mail.cypherpunks, Armadillo Remailer, "Re: Timing Attacks", Dec. 13,1995, retrieved from internet Nov. 22, 2005, http://groups.google.com/group/mail.cypherpunks/msg/fedb10d2bcf3ff6f?dmod...

Posting on mail.cypherpunks, Hoselton, Rick, "Re: Timing Cryptanalysis Attack", Dec. 14, 1995, retrieved from internet Nov. 22, 2005, http://groups.google.com/group/mail.cypherpunks/msg/470f2482c69f3212?dmo...

Declaration of Paul Kocher concerning the 1995 postings, Kocher, Paul, Dec. 16, 2005.

"Announce: Timing Cryptanalysis of RSA, DH, DSS", sci.crypt newsgroup postings, Dec. 13-15, 1995.

"Digital Signature Standard (DSS)", Federal Information Processing Standards Publication 186, May 19,1994, downloaded: Jan. 22, 2007, website: http://www.itl.nist.gov/fipspubs/fip186.htm.

"Eurocrypt '97 Rump Session Program", May 13, 1997, Konstanz, Germany, downloaded: Jan. 29, 2007, website: http://www.iacr.org/conferences/ec97/rump.html.

"Kocher Algorithm", sci.crypt newsgroup postings, Google Groupes, Mar. 12, 1996, http://groups.google.fr/group/sci.crypt/browse_thread/thread/240f02445602362e/644d5300cdbbf7e3?ink=gst&q=%q=%22Kocher+Algorithm%22&rnum=1&ht=fr#644d5300cdbbf7e3.

"Public-Key-Algorithm for Digital Signature", National Institute of Standards and Technology, Aug. 1991, pp. 553-564 (German translation).

Anderson et al., "Robustness Principles for Public Key Protocals", LNCS 963, Proc. Crypto '95, 1995, pp. 236-247.

Anderson, Ross, "Two Remarks on Public Key Cryptology", Computer Laboratory. University of Cambridge, Technical Report, No. 549, Dec. 2002, ISSN 1476-2986.

Beker et al., "Key Management for Secure Electronic Funds Transfer in a Retail Environment", Proc. Crypto '84, Springer-Verlag, 1998, pp. 401-410.

Boneh et al., "On the Importance of Eliminating Errors in Cryptographic Computations", Journal of Cryptology, 2001, vol. 14, No. 2, pp. 101-119.

Bovelander, Ernst. "Smart Card Security 'How Can We Be So Sure?'", COSIC '97 Course, Incs 1528, Springer-Verlag, 1998. pp. 333-337.

Burmester at al., "A Secure and Efficient Conference Key Distribution System", LNCS 1189, Proc. International Workshop on Security Protocols, 1996, Springer-Verlag, 1998, pp. 275-286.

Daemen, Joan, "Management of Secret Keys: Dynamic Key Handling", LNCS 1528, Proc. COSIC '97 Course, Springer-Verlag, 1998, pp. 264-276.

Frankel et al., "Proactive RSA", Sandia Report SAND96-0856, Apr. 15, 1996.

Gennaro et al., "Robust Threshold DSS Signatures", LNCS 1070, Proc. Eurocrypt '96, Springer-Verlag, 1998, pp. 354-371.

Gillogly et al., "Notes on Crypto '95 Invited Talks by R. Morris and A. Shamir", Cipher 9, Sep. 18, 1995, http://www.leee-security.org/cipher/confreports/conf-rep-Crypto95.html.

Herzberg et al., "Proactive Secret Sharing Or: How to Cope with Perpetual Leakage", LNCS 963, Proc. Crypto '95, Springer-Verlag, 1998, pp. 339-352.

Jablon, David P., "Strong Password-Only Authenticated Key Exchange", Computer Communication Review, Sep. 25, 1996, vol. 26, No. 5, pp. 5-26.

Kocher. P., Message: "Re: Timing cryptanalysis of RSA, DH, DSS (Tomazic, RISKS 17.59", The Risks Digest, Forum on Risks to the Public in Computers and Related Systems, vol. 17: Issue 60, Jan. 3, 1996. downloaded: Jan. 23, 2007, website: http://catless.ncl.ac.uk/Risks/17.60.html.

Matsumoto at al., "Speeding Up Secret Computations with Insecure Auxiliary Devices", LNCS 403, Proc. '88, Springer-Verlag, 1998, pp. 499-506.

Naccache et al., "Can D.S.A. be Improved?" -Complexity Trade-Offs with the Digital Signature Standard-', LNCS 950, Proc. Eurocrypt '94, 1995, Springer-Verlag, 1998, pp. 77-85.

Naccache, David, "Can O.S.S. be Repaired?—Proposal for a New Practial Signature Scheme-", LNCS 765, Proc. Eurocrypt '93, 1994, Springer-Verlag, 1998, pp. 233-239.

Naccache, David, "To Whom it May Concern", Forensic Expert Witness by the Court of Appeal, Paris, Dec. 6, 2006.

Quisquater et al., "Fast Decipherment Algorithm for RSA Public-Key Crypptosystem", Aug. 27, 1982, Electronics Letters Oct. 14, 1982, vol. 18, No. 21, pp. 905-907.

Rankl et al., "Smart Card Handbook", John Wiley & Sons Ltd., 1997, pp. 66-83, 182-189, 208-217, and 237-272.

Robshaw et al., "Overview of Elliptic Curve Cryptosystems", RSA Laboratories Technical Note, revised Jun. 27, 1997, downloaded: Jan. 23, 2007, website: http://www.rsasecurity.com/rsalabs/node.asp?id=2013.

Schneier, Bruce, "Applied Cryptography", 2nd Edition, John Wiley & Sons, Inc., 1996, pp. 525-573 (German translation).

Schnorr, C.P., "Efficient Signature Generation by Smart Cards", Journal of Cryptology, 1991, pp. 161-174.

Shamir, Adi, "On the Poser of Commutativity in Cryptography", LNCS 85, Proc. 7th Colloquia on Automata, Languages and Programming, 1980, pp. 582-595.

Steiner et al., "Diffie-Hellman Key Distribution Extended to Group Communication", Third ACM Conf. Computer and Comm. Security, Mar. 1996, pp. 31-37.

Yen et al., "RSA Speedup with Chinese Remainder Theorem Immune against Hardware Fault Cryptanalysis", IEEE Transactions on Computers, Apr. 2003, vol. 52, No. 4., pp. 461-472.

Anderson, Ross et al., "Tamper Resistance—a Cautionary Note", *The Second USENIX Workshop on Electronic Commerce Proceedings*, Nov. 18-21, 1996, Oakland, CA.

Chaum and Price (Eds.) "IC Cards in High-Security Applications", *Advances in Cryptology—Eurocrypt '87*, LNCS 304, Amsterdam, NE (1988), pp. 177-199.

Goutay, J., "Smart Card Applications in Security and Data Protection", *Advances in Cryptology—Eurocrypt '84*; LNCS 209, Springer-Verlag, Berlin, Germany; (1985) pp. 459-463.

Guillou, L.C. et al., "Smart Card, a Highly Reliable and Portable Security Device", *Advances in Cyrptology—CRYPTO '86*; LNCS 263, Springer-Verlag, Berlin, Germany; (1987) pp. 464-479.

Guillou, L.C., "Smart Cards and Conditional Access", *Advances in Cryptology—Eurocrypt '84*; LNCS 209, Springer-Verlag, Berlin, Germany; (1985) pp. 480-489.

Guthery, Scott, "Smart Cards", www.usenix.org/publications/login/1989-5/guthery.html; May, 1989.

Highland, Harold Joseph, "The Tempest over Leaking Computers", *Abacus*, vol. 5(2), Winter 1988, pp. 10-18, 53. http://cryptome.org/tempest-leak.htm.

ISO/IEC 7816 *International Standard*, Geneva, CH: Part 1 Physical Characteristics (Ref. No. ISO/IEC 7816-1:1998(E)), Part 1 Amendment Physical Characteristics (Ref. No. ISO/IEC 7816-1:1998/AMD.1:2003(E)), Part 2 Dimensions and Location of the Contacts (Ref. No. ISO/IEC 7816-2:1999(E)).

Krivachy, T., "The Chipcard—An Identification Card with Cryptographic Protection", *Advances in Cryptology—Eurocrypt '85*; LNCS 219, Springer-Verlag, Berlin, Germany (1986) pp. 200-207.

Kuhn, Markus G. et al., "Soft Tempest: Hidden Data Transmission Using Electromagnetic Emanation", *Second Workshop on Information Hiding*, Portland, Oregon, Apr. 15-17, 1998.

Menzes, A.J. et al., *Handbook of Applied Cryptography*, Chapters 1, 5 and 7; CRC Press, Boca Raton; Florida (1997).

Meyer, Carl H. et al., *Cryptography—A New Dimension in Computer Data Security*; Ch. 1; John Wiley & Sons, 1982.

Rankl et al., *Smart Card Handbook*, John Wiley & Sons Ltd., 1997, Chs. 2, 3, 8, 13, and pp. 84-89, Chichester, England.

Schmidt, Dick, "Visions on Development in Information Security", TNO Conference, Delft, Netherlands, Oct. 2-3, 1997.

Smulders, Peter, "The Threat of Information Electromagnetic Radiation from RS-232 Cables", *Computers and Security*, vol. 9, pp. 53-58, 1990; Elsevier Science Publishers Ltd.

The Information Offer Form, May 10, 2006, 2000-558630.

Wakerly, John F., "Introduction to Computers and Programming", *Microcomputer Architecture and Programming: the 68000 Family*, John Wiley & Sons New York, N.Y. (1989), Chapter 1, pp. 1-16.

United States Air Force Audio Visual Presentation, "So You Think You're Secure", Aerospace Audio Visual Service; TF32-4599, 1972; Military Airlift Command; TF 6502.

*Cryptography Research Inc. v. VISA International Service Association*, VISA International Service Association's Answer to Second Amended Complaint and Counterclaims, United States District Court Case No. C 04-04143 JW (HRL), Northern District of California, San Jose Division, Apr. 23, 2007.

*Cryptography Research Inc. v. VISA International Service Association*, Defendant VISA International Service Association's Final Invalidity Contentions for U.S. Patent No. 6,327,661 Pursuant to Patent L.R. 3-6(B), United States District Court Case No. 5:04-CV—04143-JW (HRL), Northern District of California, San Jose Division, Dec. 8, 2006.

Hevia, Alejandro et al., "Strength of Two Data Encryption Standard Implementations under Timing Attacks", *Lecture Notes in Computer Science 1380—LATIN '98: Theoretical Informatics* 3rd Latin American Symposium, Campinas, Brazil, Apr. 1998; pp. 192-205.

Kocher, Paul, "Differential Power analysis", *The Risks Digest*, vol. 19(80), ACM Committee on Computers and Public Policy, New York, Jun. 10, 1998. http://catless.ncl.ac.uk/Risks/19.80.html.

VISA International Service Association's Preliminary Invalidity Contentions, Filed in Case C04-4143 JW in US District Court for N. District of California, San Jose Division, Jun. 2, 2005.

Kuhn and Anderson, "Soft Tempest: Hidden Data Transmission Using Electromagnetic Emanations." Proceedings of the Second International Workshop on Information Hiding, Portland, Oregon, Apr. 1998, pp. 124-142.

Menezes, et al., "CRC Handbook of Applied Cryptography", Boca Raton, Florida: CRC Press LLC, 1996, pp. 591-634.

VISA International Service Association's Final Invalidity Contentions for U.S. Patent No. 6,278,783 Filed in Case C04- 4143 JW in US District Court for N. District of California, San Jose Division, June 28, 2007.

Alon, et al., "Efficient Dynamic-Resharing 'Verifiable Secret Sharing' Against Mobile Adversary", Mar. 25, 1995.

Charnes, et al., "Comments on Soviet Encryption Algorithm", Springer-Verlag, 1998.

Maurer, Ueli M., "A Provably-Secure Strongly-Randomized Cipher", Springer-Verlag, 1998.

Meijerand Aki, "Digital Signature Schemes", May 1982, Extended summary of paper prsented at CRYPTO 81, Santa Barbara, CA, Aug. 1981.

Shamir, Adi, "How to Share a Secret", Communications of the ACM Nov. 1979, vol. 22, No. 11.

VISA International Service Association's Final Invalidity Contentions for U.S. Patent No. 6,298,442 Filed in Case C04-4143 JW in US District Court for N. District of California, San Jose Division, Jul. 16, 2007.

Brickell, et al., "Fast Exponentiation with Precomputation (Extended Abstract)", Springer-Verlag, 1998.

De Rooij, Peter, "Efficient Exponentiation using Precomputation and Vector Addition Chains", Springer-Verlag, 1998, possibly a reprint from Advances in Cryptology, Eurocrypt '94, 1994.

Dimitrov, et al., "An Algorithm for Modular Exponentiation", Information Processing Letters, vol. 66, Issue 3, pp. 155-159, May 15, 1998.

Dimitrov, et al., "Two Algorithms for Modular Exponentiation Using Nonstandard Arithmetics", IEICE Trans. Fundamentals, vol. E78-A, No. 1, Jan. 1995.

Gollman, et al., "Redundant Integer Representations and Fast Exponentiation", Designs, Codes and Cryptography, 7, 135-151, Kluwer Academic Publishers, Boston, MA, 1996.

Hong, et al., "New Modular Multiplication Algorithms for Fast Modular Exponentiation", Springer-Verlag, 1998, from Advances in Cryptology, Eurocrypt '96, 1996.

Jedwab and Mitchell, "Minimum Weight Modified Signed-Digit Represenations and Fast Exponentiation", Electronics Letters, V. 25, No. 17, Aug. 17, 1989.

Koç, çetin K., "High-Radix and Bit Recoding Techniques for Modular Exponentiation", Intern. J. Computer Math, v. 40 pp. 139-156, 1991, Gordon and Breach Science Publishers, S.A. (UK).

Eğecioğlu and Koç, "Exponentiation using Canonical Recoding," Theoretical Computer Science 129, pp. 407-417, Elsevier, 1994.

Koç, çetin K., "High-Speed RSA Implementation", RSA Laboratories, Nov. 1994.

Lim and Lee, "More Flexible Exponentiation with Precomputation", Advances in Cryptology, Springer-Verlag, 1998 possibly from Crypto '94, Aug. 1994.

Defendant VISA International Service Association's Final Invalidity Contentions for U.S. Patent 6,539,092, filed in Case C04-4143 JW on Nov. 21, 2007, in US District Court for N. District of California, San Jose Division, including exhibits A through C17.

Beker, H.J. et al., "Simplifying Key Management in Electronic Fund Transfer Point of Sale Systems", *Electronics Letters*, 19(20):442-444, Jun. 9, 1983.

Blum, L. et al., "A Simple Unpredictable Pseudo-Random Number Generator", *Siam J. Comput.*, 13(2):364-383, May 1986.

Daemen, Joan, "Management of Secret Keys: Dynamic Key Handling", *COSIC '97 Course, LNCS 1528*, Springer-Verlag, Berlin Heidelberg, Germany, 1998, pp. 262-276.

Daemen, Joan et al., "The Block Cipher Square", *Fast Software Encryption '97, LNCS*, 1267, Springer-Verlag, Berlin Heidelberg, Germany, 1997, pp. 1-19.

ISO (International Organization for Standardization), "Banking—Key management (retail)—Part 2: Key management techniques for symmetric ciphers", ISO 11568-2 First edition Dec. 1, 1994, pp. 1-16, www.saiglobal.com/shop.

"Patent Abstracts of Japan", JP 02-187888, downloaded Jan. 10, 2007.

"Patent Abstracts of Japan", JP 05-094458, downloaded Jan. 10, 2007.

"Patent Abstracts of Japan", JP 10-171717, downloaded Jan. 10, 2007.

"Patent Abstracts of Japan", JP 60-146361, downloaded Jan. 10, 2007.

"Patent Abstracts of Japan", JP 62-166489, downloaded Jan. 10, 2007.

"Patent Abstracts of Japan", JP 64-081087, downloaded Jan. 10, 2007.

U.S. Appl. No. 11/977,392, filed Jan. 24, 2007, Paul C. Kocher et al.
U.S. Appl. No. 11/981,495, filed Oct. 30, 2007, Paul C. Kocher et al.
U.S. Appl. No. 11/978,364, filed Oct. 29, 2007, Paul C. Kocher et al.

Schneier, Bruce, *Applied Cryptography*, Chapter 12, pp. 265-301, John Wiley & Sons, Inc. (2d. Ed. 1996), New York, NY.

Grounds Of Opposition, *European Patent 1092297* in the name of Cryptography Research, Inc., Opposition by Visa Europe Services, Inc., Jan. 25, 2008.

Posting on sci.crypt newsgroup, Kocher, Paul C et al., "Announce: Timing cryptanalysis of RSA, DH, DSS" et al., messages 1-51 of 51, Dec. 11, 1995 through Dec. 24, 1995, http://groups.google,com/group/sci.crypt.

Daemen, Joan, "Management of Secret Keys: Dynamic Key Handling", Course on Computer Security and Industrial Cryptography (COSIC '97—Jun. 1997) Presentation Slides; and declaration of Professor Bart Preneel dated Jun. 15, 2007.

Piper, F., Key Management (Part 3.5) Zergo: Information Security Training Club, Hampshire, U.K., Jan. 1993, Foils 6-18 to 6-30.

Piper, F., Declaration of, Jan. 21, 2008, University of London, England.

Bradley, S., "Derived Unique Key Per Transaction Schemes," Some Applications of Mathematics to the Theory of Communications, Ch. 4, pp. 132-199, Ph.D. Thesis, University of London, England, 1994.

ISO (International Organization for Standardization), Banking—Key management (retail), "Part 3: Key life cycle for symmetric ciphers", ISO 11568-3 First edition, Dec. 1, 1994, pp. 1-16, www.saiglobal.com/shop.

American National Standard for Financial Services, secretariat—American Bankers Association (ANS/ABA X9.24-200x), Key Management Using Triple DEA and PKI, revised by Terry Benson, American National Standards Institute, Sep. 12, 2000.

Menzes, A.J. et al., Handbook of Applied Cryptography, pp. 71, 586, 636-637, CRC Press, Boca Raton, Florida (1997).

Interbank Card Association, PIN Manual: A Guide to the Use of Personal Identification Numbers in Interchange, pp. 61-127, 1979.

Sedgewick, Robert, *Algorithms*, 2nd Ed., Chapters. 4 and 11, Addison-Wesley, Arlington, VA, 1988.

Brassard, Gilles, "On computationally secure authentication tags requiring short secret shared keys", *Adv. of Crypt.*: Proceedings of Crypto -82, D. Chaum, R.L. Rivest, and A.T. Sherman, Eds. Plenum Pres, New York, NY, 1982, pp. 79-86.

Davies & Price, Security for Computer Networks: An Introduction to Data Security in Teleprocessing and Electronic Funds Transfer, John Wiley & Sons, New York, NY, 2nd Ed., 1989, 377 pages (entire book).

Defendant VISA International Service Association's Final Invalidity Contentions for U.S. Patent No. 6,304,658 Pursuant to Patent L.R. 3-6(b), Feb. 8, 2008, Case No. C04-04143 JW(HRL), U.S. District Court, Northern District of California, San Jose Division.

Defendant VISA International Service Association's Final Invalidity Contentions for U.S. Patent No. 6,381,699 Pursuant to Patent L.R. 3-6(b), Feb. 8, 2008, Case No. C04-04143 JW(HRL), U.S. District Court, Northern District of California, San Jose Division.

Defendant VISA International Service Association's Final Invalidity Contentions for U.S. Patent No. 6,510,518 Pursuant to Patent L.R. 3-6(b), Feb. 8, 2008, Case No. C04-04143 JW(HRL), U.S. District Court, Northern District of California, San Jose Division. Defendant.

Defendant VISA International Service Association's Final Invalidity Contentions for U.S. Patent No. 6,654,884 Pursuant to Patent L.R. 3-6(b), Feb. 8, 2008, Case No. C04-04143 JW(HRL), U.S. District Court, Northern District of California, San Jose Division.

Anderson, Ross & Biham, Eli, "Tiger: A Fast New Hash Function", Fast Software Encryption, Third International Workshop Proceedings, Springer-Verlag, Berlin, Germany, 1996, pp. 89-97.

Back, Adam, "non-interactive forward secrecy ", posting to *Cypherpunks.Venona.com message board*, Sep. 6, 1996. http://cypherpunks.venona.com/date/1996/09/msg00561.html.

Draper, Don et al., "Circuit Techniques in a 266-MHz MMX-Enabled Processor", *IEEE J. Solid State-Circuits*, pp. 1650-1664, Nov. 1997.

Eberle, Hans & Thacker, Charles P., "A 1 GBIT/Second GAAS DES Chip", *Proceedings of the 1992 IEEE Custom Integrated Circuits Conference*, May 3-6, 1992.

Eichelberger, E.B. & Bello, S.E., "Differential current switch—High performance at low power", *IBM J. Res. Develop.*, 35(3):313-320, May 1991.

Gonzalez, Jose Luis & Rubio, Antonio, "TCMOS: A Low Noise Power Supply Technique for Digital ICs", *Electronics Letters*, 31(16):1338-1339, Aug. 3, 1995.

Greub, Hans J. et al., "High-Performance Standard Cell Library and Modeling Technique for Differential Advanced Bipolar Current Tree Logic", *IEEE Journal of Solid-State Circuits*, 26(5):749-762, May 1991.

Hough, Charles et al., "New Approaches for On-Chip Power Switching Noise Reduction", *Proceedings of the IEEE 1995 Custom Integrated Circuits Conference*, May 1-4, 1995. pp. 133-136.

Ivey, Peter A. et al, "A Single-Chip Public Key Encryption Subsystem", *IEEE J. Solid-State Circuits*, 24(4):1071-1075, Aug. 1989.

Jablon, David P., "Strong Password-Only Authenticated Key Exchange", *Compuer Communication Review*, ACM SIGCOMM, Univ. of MA., pp. 5-26, Sep. 25, 1996.

Jarecki, Stanislaw, "Proactive Secret Sharing and Public Key Cryptosystems", thesis, Massachusetts Institute of Technology, Sep. 1995, Cambridge, MA.

Karlsson, Magnus et al., "Implementation of bit-serial adders using robust differential logic," *Proc. IEEE Nordic Event in ASIC Design Conf.*, NORCHIP'97, Tallin, Estonia, Nov. 10-11, 1997.

Larsson, Patrik, "*di/dt* Noise in CMOS Integrated Circuits", *Analog Integrated Curcuits and Signal Processing*,14:113-129, Kluwer Academic Publishers, Boston, MA, 1997.

Lin, Mao-Chao, "Constant Weight Codes for Correcting Symmetric Errors and Detecting Unidirectional Errors", *IEEE Transactions on Computers*, 42(11): 1294-1302, Nov. 1993.

Loy, James R., "Managing Differential Signal Displacement", thesis, Rensselaer Polytechnic Institute, Troy, New York, Aug. 1993.

Maier, Cliff A. et al., "A 533-MHz BiCMOS Superscalar RISC Microprocessor", *IEEE Journal of Solid-State Circuits*, 32(11):1625-1634, Nov. 1997.

Maier, Cliff, "High Speed Microprocessor Cache Memory Hierarchies for Yield-Limited Technologies", dissertation, Rensselaer Polytechnic Institute, Troy, New York, Aug. 1996.

Makie-Fukuda, Keiko et al., "Substrate Noise using Active Guard Brand Filters in Mixed-Signal Integrated Circuits", *1995 Symposium on VLSI Circuits*, Digest of Technical Papers, pp. 33-34, Jun. 8-10, 1995.

Maleki, M. & Kiaei, S., "Enhancement Source-Coupled Logic for Mixed-Mode VLSI Circuits", *IEEE Transactions on Circuits an Systems-II: Analog and Digital Signal Processing*, 39(6):399-402, Jun. 1992.

Oklobdzija, Vojin G., "Differential and Pass-Transistor CMOS Logic for High-Performance Systems", *Proc. 21st International Conference on Microelectronics* (MIEL'97), 2:803-810, Nis, Yugoslavia, Sep. 14-17, 1997.

Schettler, Helmut et al., "A CMOS Mainframe Processor with 0.5-μm Channel Length", *IEEE Journal of Solid-State Circuits*, 25(5):1166-1177, Oct. 1990.

Schindler, Volker, "High Speed RSA Hardware Based on Low-Power Pipelined Logic", Dissertation, Institut fur Angewandte Informationsverarbeitung und Kommunikationstechnologie, Graz University of Technology, Graz, Austria, Jan. 1997.

Tabor, Jeff F., "Noise Reduction Using Low Weight and Constant Weight Coding Techniques", dissertation, Massachusetts Institute of Technology, May 11, 1990, Cambridge Massachusetts.

Takashima, Daisaburo et al, "Noise Suppression Scheme for Gigabit-Scale and Gigabyte/s Data-Rate LSI's", *IEEE Journal of Solid-State Circuits*, 33(2):260-267, Feb. 1998.

Tallini, Luca G. & Bose, Bella, "Design of Balanced and Constant Weight Codes for VLSI Systems", *IEEE Transactions on Computers*, 47(5):556-572, May 1998.

Texas Instruments, SN54LS138, SN54S138, SN74LS138, SN74S138A 3-Line to 8-Line Decoders/Demultiplexers, Texas Instruments, Dallas, Texas, revised Mar. 1988.

Wang, L.K. & Chen, Howard H., "On-Chip Decoupling Capacitor Design to Reduce Switching-Noise-Induced Instability in CMOS/SOI VLSI", *Proceedings 1995 IEEE International SOI Conference*, pp. 100-101, Oct. 1995.

Williams, Ted E. & Horowitz, Mark, "Bipolar Circuit Elements Providing Self-Completion-Indication", *IEEE Journal of Solid State Cicuits*, 25(1)309-312, Feb. 1990.

Naccache, David, *Declaration of Professor David Naccache*, with regards to his attendance during Adi Shamir's talk titled "How to Check Modular Exponentiation" at the rump session of Eurocrypt 1997, held on May 13, 1997, Paris, France; date of reference: Dec. 6, 2006.

Meyer, Carl H. et al., *Cryptography—A New Dimension in Computer Data Security*, pp. 100-105, 457-464, and 486, John Wiley & Sons, 1982; New York, NY.

Kocher, Paul, "Protection Against DPA and Related Attacks", *Electronics World*, pp. 32-36, Mar. 2008; United Kingdom.

Black, Coral Elizabeth, "Witness Statement of Coral Elizabeth Black", Opposition: Cryptography Research Inc.'s European patent 1 050 133 B1, Jun. 26, 2008, setting the public divulgation date of a previously cited reference as Feb. 7, 1995; United Kingdom.

Brief Communication from the European Patent Office dated Aug. 11, 2008, enclosing "Further Submission on the Second Opponent's Opposition" to EP 1 150 133 B1, Aug. 1, 2008, London, England.

Schneier, Bruce, *Applied Cryptography, Second Edition: Protocols, Algorithms, and Source Code in C*, Chapter 16.3, pp. 379-381, John Wiley & Songs, Inc. New York, NY, 1996.

Cryptography Research, Inc., observations on oppositions to EP 99949533.6, Feb. 18, 2009, London, UK.

Cryptography Research Inc., letter from Aidan Robson to EPO regarding EP 1050133, Nov. 13, 2008.

Cryptography Research Inc., Observations on Oppositions filed to EP 1050133, Nov. 13, 2007.

Cryptography Research Inc., Oppositions to EP 1050133 of Cryptography Research Inc., Submissions by the Proprietor in response to the Summons to attend Oral Proceedings, Oct. 2, 2008.

EPO, Communication regarding Visa Europe Services Opposition to EP 1092297, Mar. 3, 2008, Munich, Germany.

EPO, Notice & Grounds of Opposition of VISA Europe Services, Inc. against European Patent 1 050 133, vol. 1, Feb. 2, 2007, London, UK.

EPO, Notice of Opposition to European Patent by Infineon Technologies, AG,. against European Patent 1 050 133, Feb. 3, 2007, Munich, Germany, (in the German language).

EPO, Notice of Opposition to European Patent by NXP B.V. against European Patent 1 050 133, Feb. 5, 2007, Dusseldorf, Germany.

EPO, Notice & Grounds of Opposition by VISA Europe Services, Inc. against European Patent 1 050 133, vol. 2, Feb. 1, 2007, London, UK.

EPO, Notice of Opposition to European Patent by NXP B.V. against European Patent 1 088 295, May 15, 2008, Dusseldorf, Germany.

EPO, Communication to the parties concerning termination of opposition proceedings in EP 1092297, Sep. 24, 2008, Munich, Germany.

EPO, Decision of the Technical Board of Appeal 3.4.02 in EP application No. 00935973.8, May 9, 2008.

European Patent Office, Summons to attend oral proceedings pursuant to Rule 115(1) EPC regarding EP 1050133, including the EPO's preliminary opinion, Jun. 16, 2008, Munich, Germany.

Infineon Technologies AG, letter withdrawing its opposition to EP 1050133, Aug. 14, 2008, Munich, Germany.

Infineon Technologies AG, letter to the European Patent Office calling for the revocation of European Patent 1 050 133, Feb. 3, 2007 (in the English language).

Infineon Technologies AG, letter withdrawing its opposition to EP 1088295, Aug. 14, 2008, Munich, Germany.

NXP B.V., letter withdrawing its opposition to EP 1050133, Nov. 4, 2008, Dusseldorf, Germany.

NXP B.V., letter withdrawing its opposition to EP 1084543, Nov. 4, 2008, Dusseldorf, Germany.

Visa Europe Services, application for re-establishment of rights pursuant to Article 122 EPC in EP 1092297, Mar. 20, 2008, London, U.K.

Visa Europe Services, Inc. letter withdrawing its opposition to EP 1050133, Sep. 9, 2008, London, UK.

Visa Europe Services, letter from opponents informing EPO of withdrawal of opposition to EP 1092297, Sep. 9, 2008, London, U.K.

Perry, Thomas J., "Assignment of Rights", between NXP and Thomas J. Perry with exhitbit A of communications including the participation of Thomas J. Perry, Feb. 3, 2007, Phoenix, AZ.

Stewart, Bill "Assignment of Rights", between NXP and Bill Stewart with exhibit a of communications including the participation of Bill Steward, Dec. 12, 2006, Santa Clara, CA.

Letter from NXP B.V. to the European Patent Office concerning the Oral Proceedings in EP patent 1 050 133, Oct. 2, 2008.

Stewart, Bill, Declaration of Bill Stewart regarding his newsgroup posting on Dec. 13, 1995, signed in Mountain View CA, on Oct. 2, 2008.

Stewart, Bill et al., "Announce: Timing cryptanalysis of RSA, DH, DSS", posting on Google Groups sci.crypt, Dec. 13, 1995, http://groups.google.de/group/sci.crypt/ browse.

Stewart, Bill, "Potential defense against timing attack on Diffie-Hellman", postings on *Cypherpunks*, Dec. 12-13, 1995, http://diswww.mit.edu/menelaus/cpunks/45312.

European Patent Office, "Communication of a notice of opposition" to European patent 1 084 543 by NXP B.V., Oct. 31, 2008.

Naccache, David & M'Raihi, David, "Cryptographic Smart Cards", *IEEE Micro* 16(3):14-24, Jun. 1996.

Intel & Microsoft Corporations, "Advanced Power Management (APM); BIOS Interface Specification", Rev. 1.2, pp. 4, 5, and 8, Feb. 1996, U.S.A.

Nordman, Bruce et al., "User Guide to Power Management for PCs and Monitors", Environmental Energy Technologies Division, Lawrence Berkeley National Laboratory, University of California, pp. 5 and 9-14, Jan. 1997, Berkeley, CA.

European Patent Office, Interlocutory decision in Opposition proceedings, EP 1050133, Dec. 1, 2008, Munich, Germany.

Patentee's Observations on withdrawn NXP B.V. opposition in European patent application No. 99937153.7-1525 (1084543), said Observations filed with the European Patent Office on Jun. 2, 2009.

Communication from the European Patent Office regarding further examination of the oppositions(s) for EP patent application No. 99937153.7-1525 (EP patent 1084543), said Communication dated Jul. 22, 2009.

Decision to discontinue the opposition proceedings in European patent No. 1088295, said Decision mailed by the European Patent Office on Aug. 26, 2009.

Decision rejecting the opposition against European patent No. 1084543, said Decision mailed by the European Patent Office on Oct. 6, 2009.

Notice of Allowance in related U.S. Appl. No. 11/981,495, mailed May 5, 2010.

* cited by examiner

PREVENTION OF SIDE CHANNEL ATTACKS AGAINST BLOCK CIPHER IMPLEMENTATIONS AND OTHER CRYPTOGRAPHIC SYSTEMS

RELATED APPLICATIONS

This patent application is a continuation of U.S. patent application Ser. No. 09/930,836, filed Aug. 15, 2001 now U.S. Pat. No. 7,668,310, which patent application is hereby incorporated by reference in its entirety and is a continuation of and claims the priority benefit of U.S. patent application Ser. No. 09/324,798, filed Jun. 3, 1999 (now U.S. Pat. No. 6,278,783), which in turn claims the benefit of U.S. provisional patent application No. 60/087,826, filed Jun. 3, 1998. U.S. patent application Ser. No. 09/324,798 is related to U.S. patent application Ser. No. 09/224,682, filed Dec. 31, 1998.

FIELD OF THE INVENTION

The method and apparatus of the invention relate generally to securing cryptographic systems against external attacks and, more specifically, to preventing attacks that involve the external monitoring of cryptographic operations.

BACKGROUND OF THE INVENTION

Cryptographic operations are used for a variety of processes such as data encryption and authentication. In a typical symmetric cryptographic process, a secret key is known to two or more participants, who use it to secure their communications. In systems using asymmetric (or public key) cryptography, one party typically performs operations using a secret key (e.g., the so-called private key), while the other performs complementary operations using only non-secret parameters (e.g., the so-called public key). In both symmetric and asymmetric cryptosystems, secret parameters must be kept confidential, since an attacker who compromises a key can decrypt communications, forge signatures, perform unauthorized transactions, impersonate users, or cause other problems.

Methods for managing keys securely using physically secure, well-shielded rooms are known in the background art and are widely used today. However, previously-known methods for protecting keys in low-cost cryptographic devices are often inadequate for many applications, such as those requiring a high degree of tamper resistance. Attacks such as reverse-engineering of ROM using microscopes, timing attack cryptanalysis (see, for example, P. Kocher, "Timing Attacks on Implementations of Diffie-Hellman, RSA, DSS, and Other Systems," *Advances in Cryptology—CRYPTO '96*, Springer-Verlag, pages 104-113), and error analysis (see, for example, E. Biham and A. Shamir, "Differential Fault Analysis of Secret Key Cryptosystems," *Advances in Cryptology—CRYPTO '97*, Springer-Verlag, 1997, pages 513-525) have been described for analyzing cryptosystems.

Ciphers and algorithms believed to be cryptographically secure are known in the background art. For example, protocols using triple DES (a cipher constructed using three applications of the Data Encryption Standard using different keys) can resist all feasible cryptanalytic attacks, provided that attackers only have access to the standard inputs to and outputs from the protocol. However, even a product using an extremely strong cipher such as triple DES can be insecure if the keys are not managed securely.

This document assumes a detailed understanding of the Data Encryption Standard (DES), which is defined in Federal Information Processing Standards Publication 46 and need not be described in detail here. Information on DES and other cryptographic algorithms can also be found in *Applied Cryptography* by Bruce Schneier (Wiley and Sons, Inc., 1996), in the *Handbook of Applied Cryptography* by Menezes et al. (CRC Press, Inc., 1997), or in other standard references as will be appreciated by those skilled in the art.

SUMMARY OF THE INVENTION

This invention describes processes in which secrets (e.g., keys and/or messages) are divided into separate portions, which are then separately mutated, while maintaining mathematical relationships between or among the portions that are used for performing secure cryptographic operations. In the update ("mutation") operation, key management devices introduce randomness or other unpredictability into their internal state. By changing the secret portions, information collected by attackers about them can be made obsolete. If information is invalidated faster than it can be collected by attackers, a system can be made secure.

The invention provides for improved implementations of the Data Encryption Standard (DES), as well as other cryptographic operations, that resist external monitoring attacks. Unlike traditional DES implementations, which perform a set of processing operations that depend only on the input key and the message, the invention involves additional random (or otherwise unpredictable) state information in the cryptographic processing. The random state information is mixed with the keys, plaintext messages, and intermediate quantities used during processing. Information leaked to attackers during cryptographic processing is correlated to the random information, and any correlation to secret information is partially or completely hidden. As a result, it is difficult or impossible for attackers to determine secret parameters through analysis of leaked information.

A detailed description of how the invention may be applied to the Data Encryption Standard is provided. State parameters that are normally encoded as ordinary binary values are blinded and their order masked using randomized permutation tables. While a traditional DES implementation would encode the input message M as a 64-bit value, an exemplary embodiment of the invention blinds M to produce a two-part value (M1, M2) such that M1 XOR M2 corresponds to the "normal" message. Additionally, the parameters M1 and M2 are encoded in random order, where permutations M1P and M2P are stored in memory to keep track of the current order of the bits in M1 and M2. Keys may be similarly stored in blinded, order-randomized form. M1P and M2P contain bit ordering information and do not represent message content. The message blinding technique of the invention ensures that neither M1 by itself nor M2 by itself is correlated to the message in any way. Consequently, the implementation can remain secure even if the complete value of any parameter is leaked to an attacker.

The standard DES algorithm involves three primary types of operations: permutations, S lookups, and bitwise XORs. In the exemplary embodiment, permutations of the message (M1, M2, M1P, M2P) are performed by manipulating M1P and M2P. Only the permutation arrays are manipulated; the parameter data bits in M1 and M2 do not need to be accessed or modified. Permutations (such as IP, PC1, E, P, and FP, which are defined as part of the standard DES algorithm definition) can thus be made safe against leakage. For XOR operations, halves of the input parameters are processed separately. For example, using the message notation above, the operation of computing the XOR of two values A and B encoded as (A1, A2, A1P, A2P) and (B1, B2, B1P, B2P) is computed by first finding the XOR of (A1, A1P) and (B1, B1P), then finding the XOR of (A2, A2P) and (B2, B2P). Note that because of the blinding, A1 and B1 by themselves are not correlated to the complete value of A or B. Order randomization is used to prevent attackers from obtaining information about A and B from correlations within and between observations of the two XOR operations. Finally, for the S table lookup operations, the S tables themselves are stored in the device's memory in blinded form, such that the S table inputs and outputs are blinded with random values. To perform an S operation, the inputs (e.g., A1, A2, A1P, A2P), the S table input blinding factor, and the S input table permutation are combined and used to index the S table itself. (The S tables are blinded and randomly permuted, and are re-shuffled periodically.) The S results are obtained in halves, which are separately processed through the P permutation and XORed onto the destination. Sixteen rounds are performed, ultimately yielding the final ciphertext. The ciphertext is produced in permuted, blinded form, which may be easily converted to the standard DES ciphertext.

Although the invention has been described in the context of permuting both keys and messages, each into two sub-parts, those skilled in the art will appreciate that either or both (as well as other secret quantities) could be permuted, into a plurality of parts greater than two. In addition, although the invention has been described with respect to DES, the invention can be applied to and adapted to other cryptographic symmetric algorithms, including without limitation Blowfish, SEAL, IDEA, SHA, RC5, TEA, and other cryptographic algorithms involving operations suitable for application of the techniques of this invention. In all such cases, including DES, the term "plaintext" as used herein shall be understood to refer to the quantity that is in plaintext form relative to whatever cryptographic protocol is being used (e.g., DES). Thus, a "plaintext" quantity could actually be encrypted using some other algorithm and still be within the meaning of plaintext relative to the cryptographic protocol under consideration.

DETAILED DESCRIPTION OF THE INVENTION

Reduction of Signal-to-Noise Ratios

Figure 1:
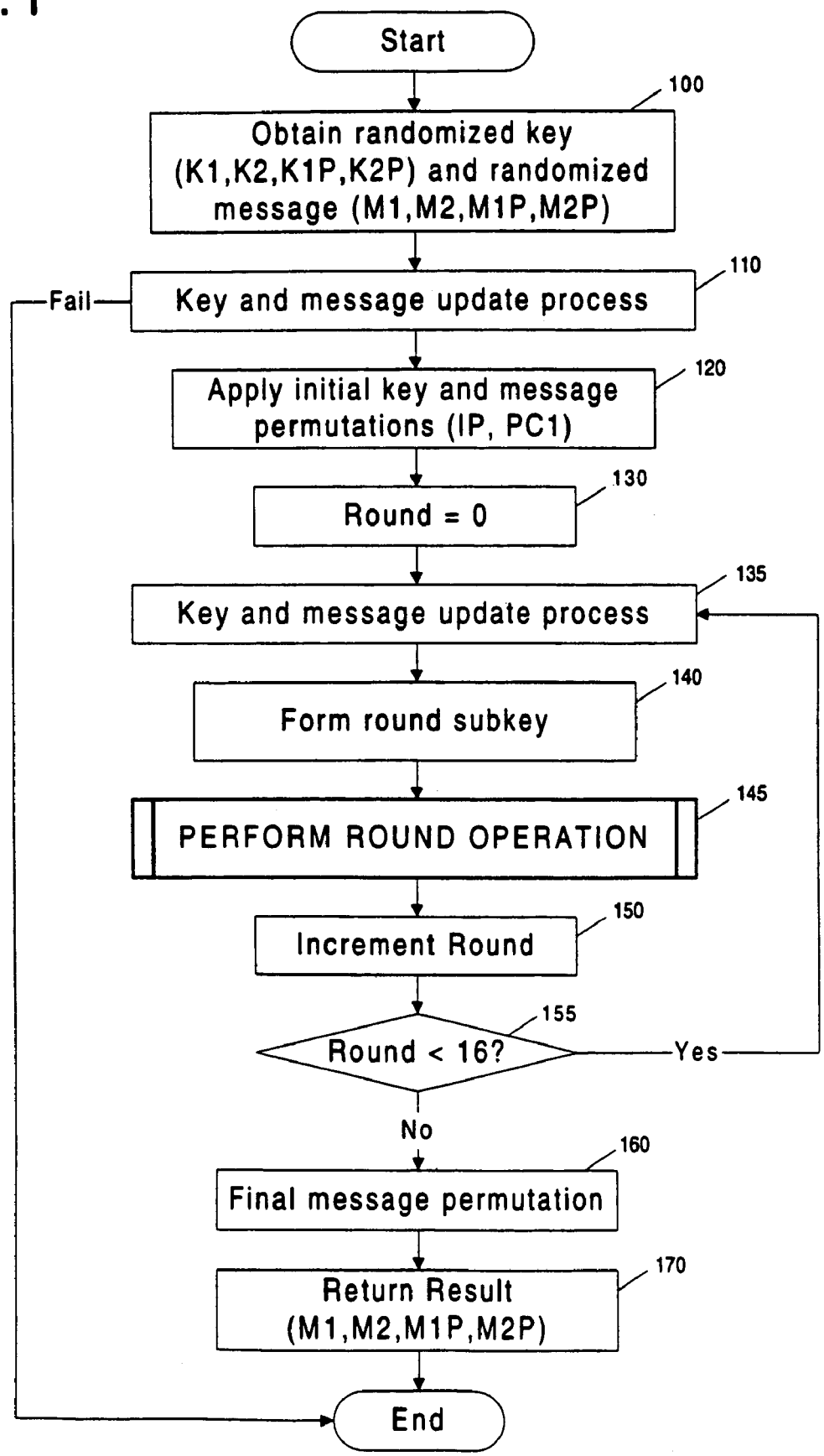
FIG. 1 shows an exemplary embodiment of a leak-minimized DES method.

To obtain a secret key from a cryptographic system (cryptosystem) that leaks information, an attacker can gather data by observing a series of operations, perform statistical analysis on the observations, and use the results to determine the key.

In a common situation, an attacker monitors a physical property, such as power consumption, of a secure token as it performs a cryptographic operation. The attacker collects a small amount of data related to the key each time the token is observed performing a cryptographic operation involving the key. The attacker increases the amount of information known about the key by collecting and statistically correlating (or combining) data from multiple observations of the token as it performs operations involving the key (or related key).

In the case of a cryptosystem which is leaking information, such observations may contain signal (i.e., information correlated usefully to the key). However, such observations also contain noise (i.e., information and error that hinder or are irrelevant to determination of the key). The quality of the information gained from these observations is characterized by a "signal to noise" (or S/N) ratio, which is a measure of the magnitude of the signal compared to the amount of noise.

The number of operations that the attacker must analyze to recover the key depends on the measurement and analysis techniques, but is generally inversely proportional to the square of the S/N ratio. The constant of proportionality also depends upon the amount of confidence the attacker requires. For example, a relatively low confidence level may be acceptable to an attacker willing to do an optimized brute force search using statistical information about key bit values. Decreasing the signal by a factor of 15 and increasing the amount of measurement noise by a factor of 20 will reduce the signal-to-noise ratio by a factor of 300. This will generally mean that an attacker will require roughly 90,000 times as many observations to extract the same amount of information about the key. An attack requiring 1,000 observations to recover a key before the S/N reduction would now require on the order of 90 million observations to gain the same level of confidence in the recovered key.

A principal objective of the invention is to make cryptosystems that are difficult to attack successfully, for example by increasing the number of observations required by an attacker to compromise a key. By reducing the available signal size and/or increasing the amount of error, noise, and uncertainty in attackers' measurements, a system designer can make the so-called work function (effort required) to break a system larger. Ideally, the number of samples required to gain any significant amount of useful key information should exceed the maximum number of transactions that can be performed using the key, exceed the number of transactions that can be performed by the device (e.g., before the key expires), or else be so large that monitoring attacks are of comparable or greater difficulty than brute force and other known attacks. For example, consider a system programmed to self-destruct after one million operations (well beyond the expected operational life of most smartcards). If attackers are limited to measurements with a signal-to-noise ratio (across an entire transaction) well below 1/1000, the attacker would be unable to collect enough measurements to compromise the device.

For physically large systems, effective physical shielding, physical isolation, and careful filtering of inputs and outputs are known in the background art (e.g., U.S. government Tempest specifications). Such shielding techniques can protect cryptographic devices from external monitoring attacks that involve analyzing power consumption, electromagnetic radiation (both in air and coupled to the device's inputs and outputs), electrical activity within the device, etc. as well as protecting against physical attacks. Unfortunately, these techniques are difficult to apply in constrained engineering environments. For example, physical constraints (such as size and weight), cost requirements, and the need to conserve power can often prevent the use of previously-known shielding techniques.

Leak-Minimizing DES: Introduction

The Data Encryption Standard (DES) is widely used as a cryptographic primitive for data encryption, pseudorandom number generation, MACs, and other cryptographic operations. The basic DES encryption algorithm uses a 56-bit key to transform a 64-bit plaintext block into a 64-bit ciphertext block. The corresponding decryption operation uses the same key to transform ciphertext blocks into their corresponding plaintexts. This discussion will assume the reader has a detailed understanding of the well-known DES algorithm, which need not be discussed in detail here. For more information about DES (and other cryptographic algorithms), see *Applied Cryptography* by Bruce Schneier or the *Handbook of Applied Cryptography* by Menezes et al.

The DES implementation of the invention incorporates one or more novel features (as will be described below in an exemplary embodiment of the invention) to provide resistance to external monitoring attacks. The invention may be used to address various sources of information leakage such as, without limitation:

(a) Permutations (such as the key permutation PC1) can leak the key bits by having different characteristics when "0" and "1" bits are permuted. In an extreme example, if conditional jumps are performed depending on the values of key bits, observation of the microprocessor's power consumption can reveal whether the jumps are taken. Thus, analysis of measurements from permutation operations can reveal the secret key.

(b) The standard DES C and D registers are each 28 bits long and must be rotated once or twice in each round. These 28 bit long quantities do not fit exactly in standard 8, 16, or 32-bit microprocessor registers. Consequently, bits that rotate off the end of each microprocessor register must be carried to the next register. Observation of the power consumption and/or timing can reveal whether the carried bits in each round equal zero or one, revealing some or all of the key bits.

(c) Data manipulation operations reveal information about the data being processed. For example, the power consumption of a typical operation (whether in a microprocessor or gate-level hardware implementation of DES) is correlated to the data being manipulated. For example, shifting a byte with a Hamming weight of 5 will take a significantly different amount of power than shifting a byte of Hamming weight 4. Another example: power consumption is correlated to values on the address bus (such as addresses of bytes fetched for S table lookups), revealing information about the internal processing of the DES algorithm. An attacker can verify guesses about key bits by checking whether expected biases or effects appear in collected data.

(d) Table lookup operations leak information about the address of the memory lookup and the value that is returned. Particularly serious sources of such leakage include the device's power consumption and electromagnetic radiation. Signals radiated from the address and data bus lines connecting a device to the memory containing the table (e.g., ROM or RAM) can be detected and analyzed to gain information about the DES outputs, which in turn can compromise the keys. Similarly, power consumption analysis can reveal information about the S lookups.

(e) Operations that change the device state (including the memory contents, processor flags, registers, etc.) can reveal information about the initial and final states of the operation. For example, the power consumption characteristics may be distinguishable for a register bit holding a zero value, a register bit holding a one value, a register changing from zero to one, and a register changing from one to zero. Note that devices with parallel redundant independent computational units with inverted logic can still leak information by their state transitions even though the total number of zero and one bits in the device's state remains constant.

(f) Variations between individual transistors in an integrated circuit, variations in the electrical properties of wires within a chip, variations in the amount of electromagnetic radiation emitted by different wires, etc. can all provide variations detectable by an attacker that can be analyzed statistically to determine secret keys.

Note that multiple observations are often required to determine keys or otherwise break the system. (It is not always necessary to find the key to break a system. For example, determining a message's plaintext can be as useful as finding the key, and the attacks may be used to do this.) As mentioned previously, statistical analysis may be used to extract useful signals from measurements. For example, a computer can digitally filter a signal to average out noise, identify frequency components of interest, etc. Analog filtering techniques may also be used (such as using a high-pass and/or low-pass filters, tuners, etc. to isolate signals of interest).

The exemplary leak-minimized DES implementation of the invention addresses these and other weaknesses via a number of security-enhancing techniques that, although used together in the exemplary embodiment, may be deployed individually or in various combinations, as will be appreciated by those skilled in the art. The implementation will be fully described below with regard to encryption only. However, those skilled in the art will readily appreciate how to apply the principles demonstrated here to decryption operations because encryption and decryption are extremely similar and use the same Feistel "F" function. For the convenience of the reader, certain differences between the two implementations will be noted where they are significant. Finally, those skilled in the art will also appreciate that the techniques demonstrated here can also be applied to combined encryption/decryption DES functions.

In one embodiment of the invention, the inputs to the DES function (the plaintext and the key, when encrypting) are encoded in a different form than usual. Standard DES implementations use a 56-bit key K (commonly stored as 8 bytes with an ignored parity bit in each byte) and a 64-bit plaintext message M. However, the process of loading a key or message into a standard DES implementation can leak information about the key or plaintext.

Thus, a preferred improved DES implementation of the invention instead uses two 56-bit keys (K1 and K2) and two 64-bit plaintext messages (M1 and M2), each associated with a permutation (i.e., K1P, K2P, M1P, M2P) such that K1P{K1} XOR K2P{K2} equals the "standard" DES key K, and the M1P{M1} XOR M2P{M2} equals the "standard" plaintext. In the notation used above and throughout this document, "X{Y}" denotes the result of applying permutation X to Y; "X[Y]" denotes element Y of array X; and "X[Y][Z]" denotes element Y,Z of the two-dimensional array X.

In this embodiment, the permutations and blinded values can be produced as follows. To produce K1 and K2 from a 56-bit key K, a random value K1 is produced, then K2 is computed as K2=K XOR K1. (As used herein, the term "random" shall include truly random values, as well as pseudorandom and other values that are unpredictable by an attacker. Methods for producing random values are well known in the background art and need not be described in detail here.) Next, random permutations K1P and K2P are produced, and K1P-inverse is applied to K1 and K2P-inverse is applied to K2. Similarly, to divide a message M into M1 and M2, M1 is set to equal a 64-bit random value, then M2 is set to M2=M XOR M1. Next, random permutations M1P and M2P are created and their inverses are applied to M1 and M2, respectively. The permuted keys and messages are then used, rather than the standard key and message, during the course of cryptographic operations. Although not necessary to the present invention, the exemplary embodiment has the properties that: (a) for any key, H(K1) and H(K2) average to 64/2=32, where H(X) is the Hamming Weight of X, (b) the probability that any specific bit in either K1 or K2 is a 1 is 0.5, and (c) correlations between register locations and key bits are weak (or equal to exactly 0.5). These properties can reduce the amount of useful information leaked by the system to an attacker.

At the end of such operations, the two parts of the ciphertext may be recombined to form the same encrypted/decrypted quantity that would have been produced by a standard DES protocol.

For ephemeral keys and messages (i.e., those only used for a small, limited number of operations), the splitting may be simply performed when the key or message is used. However, for long-term keys used for a large number of operations, it is preferable to store keys in split form to ensure that splitting operations will not reveal information about the keys. (The exemplary embodiments described may be used in either case.)

The leak-minimizing DES implementation must be initialized before it can be used. Such initialization can occur at any time before the leak minimizing cryptographic operations are used, including, without limitation, when the device is manufactured, personalized, installed, activated, downloaded, first used, keyed, etc.

Leak-Minimizing DES: Initialization and S Updates

Initialization provides starting values for the permutations, S tables, and associated parameters. The following parameters are initialized, in no particular order (i.e., one order is shown for convenience, but the actual order of initialization does not matter):

(a) Define S_ORDER_TABLE[0 . . . 7] to contain 0 . . . 7 in random order. (Certain implementations may elect to use the high-order bits in S_ORDER_TABLE for Hamming Weight equalization, e.g. by storing 0x70, 0x61, 0x52, 0x43, 0x34, 0x25, 0x16, 0x07 in the table. However, if this is done, accesses to S_ORDER_TABLE should discard the high-order bits. One of skill in the art will appreciate that similar balancing may be applied to other tables and operations as well.)

(b) Create S_INPUT_MASK[0 . . . 7] as a table containing 8 random 6-bit entries (i.e., with values in the range 0 . . . 63), one for each S table, in the order specified by S_ORDER_TABLE.

(c) Create a random S_INPUT_PERM[0 . . . 7][0 . . . 5] where each of the eight S_INPUT_PERM arrays contains 0 . . . 5 in random order.

(d) Create a random S_OUTPUT_ORDER[0 . . . 7][0 . . . 7], where each of the eight S_OUTPUT_ORDER arrays contains 0 . . . 3 in random order in its first 4 elements and 0 . . . 3 in random order in its second 4 elements.

(e) Create a random 32-bit S_OUTPUT_MASK. The 32 bits of S_OUTPUT_MASK are used to blind and unblind the S table outputs. (In this exemplary embodiment, each of the S tables uses 4 blinding bits.) As will be described in (f), the value of S_OUTPUT_MASK is used to produce the blinded S tables.

(f) Create S_TABLE[0 . . . 7][0 . . . 63] such that S_TABLE [i][j] is computed using standard DES S table t (where t is between 1 and 8 inclusive) as follows: Let i=S_ORDER_TABLE[t−1]. Let w=S_INPUT_PERM [i]{j} XOR S_INPUT_MASK [i]. Let x equal the result of looking up w in the DES S table t (where the lookup process includes using bits 0 and 5 of w to select a permutation within the table and bits 1 . . . 4 to select the offset within the permutation as defined in the DES specification). Let y equal x XORed with the 4 bits of S_OUTPUT_MASK that correspond to the output of S table t (selected by applying the inverse of the P permutation to S_OUTPUT_MASK then taking bits 4$t$ through (4$t$+3) in the result). Next, compute an 8-bit value z that equals y XORed with 17 times a random 4-bit value. Finally, set S_TABLE[i][j]=S_OUTPUT_ORDER[i]{z}.

While it is preferable that each device be initialized with unique random parameters (S_TABLE, etc.), cost constraints or other considerations may sometimes make it necessary to initialize multiple devices identically. Similarly, if multiple devices share a key, it is preferable (but not required) that the key be initialized in each with a unique set of key parameters (K1, K2, K1P, K2P).

For greater security, during operation of the device the tables are preferably periodically updated so that attackers will not be able to obtain the table contents by analysis of measurements. The updating process should preferably introduce fresh entropy into the tables faster than information leaks out. Such an update process can require a significant amount of time, particularly if the S tables are stored in memory such as some EEPROM that is slow to update. To prevent the update process from introducing unpredictable processing delays, the update can occur gradually, so that a portion of the S table is updated at a time. Idle time, if available, can also be used for table updates.

One way to implement the update process is to have each of the main arrays (S_INPUT_MASK, S_INPUT_PERM, S_OUTPUT_ORDER, and S_TABLE) contain 9 elements (one more than the required eight), such that an extra element is always available for preparing new (updated) tables. The table update process transforms any one of the 8 active parameter sets, places the result into free array entries, then updates S_ORDER_TABLE and S_OUTPUT_MASK when the updated tables are ready to use. To update an S table block, an input index (m) and an output index (n) are selected, where m is an index to the existing entry to be updated in each of the arrays and n is an index to the free array entries where the updated values will be placed. The device creates and stores new values for the parameters at S_INPUT_MASK[n], S_INPUT_PERM[n][0.5], S_OUTPUT_ORDER[n][0 . . . 7], and S_OUTPUT_MASK. (The new S_OUTPUT_MASK has new random bits in the position corresponding to S_ORDER_TABLE[m], but the other bits are not changed.) Next, the device translates the S_TABLE[m][0 . . . 63] into S_TABLE[n][0 . . . 63], compensating for the old parameter set (S_INPUT_MASK[m], S_INPUT_PERM[m][0 . . . 5], S_OUTPUT_ORDER[m][0 . . . 7], and S_OUTPUT_MASK) and incorporating the changes appropriate for the new parameter set (S_INPUT_MASK[n], S_INPUT_PERM [n][0 . . . 5], S_OUTPUT_ORDER[n][0 . . . 7], and the new S_OUTPUT_MASK). Alternatively, if a copy of the standard (non-blinded, etc.) S table is available, its values may be used to perform the update, in which case the old parameter set is not required for the update. Once the new S_TABLE is complete, S_ORDER_TABLE is updated by replacing the value m with the value n. Also, S_OUTPUT_MASK is replaced with its new value. Although not strictly required, the update to S_ORDER_TABLE and to S_OUTPUT_MASK is preferably done as a single reliable memory update, since update of only one could cause incorrect operation. If unreliable memory updates are used during other memory updates, the new table should be checked against the old one for correctness. Additionally, a test operation can be performed using a test key to verify correct operation before important keys are used with the implementation. Alternatively or additionally, complete and error-free write operations may be used for table update operations, although these memory updates are typically much slower than standard unverified memory updates.

Leak-Minimizing DES: Encryption (and Decryption)

A traditional DES encryption process uses a key K to transform a 64-bit input message M into a result. FIG. 1 shows an exemplary DES encryption process of the invention. At step 100, a transformed input message is obtained or prepared as two 64-bit data messages (M1 and M2) each with an order permutation (M1P and M2P), such that M=M1P{M1} XOR M2P{M2}. Also at step 100, a transformed key is obtained, similarly encoded as K1, K2, K1P, and K2P. If the message and key are not available in this form, they are converted thereto. For example, to transform the message M, the device obtains a random 64-bit value R, computes M1=M XOR R and M2=R, creates randomized permutations M1P and M2P, and permutes M1 and M2 according to the inverses of MIP and M2P (i.e., replaces M1 and M2 with MIP_Inverse{M1} and M2P_Inverse{M2}, respectively). A similar transformation can be applied to the key K. This process can be performed at any time before the results are required (e.g., in advance, at the beginning of the DES operation, at (or instead of) step 110 or 120 below, etc.). (The foregoing encoding is described for exemplary purposes only; one of ordinary skill in the art will appreciate that many alternate encodings are possible and may be used. For example, more than two sub-parts could be used, and other functions besides XOR could be used. Such variations will be appreciated by those skilled in the art in light of the exemplary embodiment of the invention described herein.)

At step 110, key and message update processes are performed. At the beginning of the update process, a failure counter C is incremented and checked against a threshold value. If the threshold is reached, the operation fails and terminates. Otherwise, the input parameters for the key (K1, K2, K1P, K2P) and message (M1, M2, M1P, M2P) are updated. The update process consists of two basic operations: reordering and randomizing. Reordering updates the positions of data bit and permutation entries. Exchanging pairs of elements in K1P (or K2P) and the complementary pair of bits in K1 (or K2) does not change the effective value of the message but does reorder its encoding. Randomizing blinds the data bit values, in this embodiment through an XOR operation. XORing the same random Boolean value onto a bit of K1 and the corresponding bit of K2 also does not have any effect on the value of K1P{K1} XOR K2P{K2}. To avoid correlation attacks, an XOR table is constructed with the value to XOR, permuted with K1P and K2P, and finally separately applied to K1 and K2. If the key is to be used in future transactions, the input parameters for the key are overwritten in the long-term memory with the updated values (using a complete and error-free write operation). As noted, the input parameters for the message (M1, M2, M1P, M2P) may be reordered and randomized in a similar fashion as for the key. Finally, the failure counter C is set to zero. At this point, the key and message have been successfully randomized, so attackers cannot force the device to process the same key repeatedly by introducing power failures or other processing interruptions.

At step 120, the initial permutation (IP), which is a part of the standard DES algorithm, is applied to the input message. Because M1 and M2 are stored in permuted form, the initial permutation needs to affect the value of M1P{M1} and M2P{M2}. Although it is possible for an implementation to modify the data (i.e., M1 and M2), it is not necessary. The permutation operation can be applied by manipulating only the permutation tables themselves, by applying the IP to the permutations M1P and M2P, e.g. by computing a new M1P=IP{M1P} and a new M2P=IP{M2P}. Optionally, additional reordering or randomizing of the data (as was performed at step 110) may be performed as well.

Also at step 120, the PC1 permutation, which is a part of the standard DES algorithm, is applied to the input key. As with the IP, the permutation operation can be applied by manipulating only the permutation tables themselves (K1P and K2P) and do not necessarily need to involve the data. Note that as a performance optimization, keys that will be used often may be stored with this permutation already applied. To improve performance, PC2 can also be applied at this step to simplify the permutation operation required in each round by enabling the combining of PC2 with the shift operations. (The remaining 8 unused key bits are stored to the right of the 48 output bits of PC2 to maintain the 56 bit key length.) Optionally, additional reordering or randomizing of the key (as was performed at step 110) can be performed.

At step 130, the round counter is initialized to zero. At step 135, the key and message parameters are updated, as in step 110.

At step 140, the round key is prepared by permuting the key (K1, K2, K1P, K2P) to separate the 6 key bits required for each of the 8 S operations. If the PC1 step above is optimized, this step combines the round key left rotates (or right key rotates when decrypting) and PC2 operation in a single 56-to-56 permutation. The complete permutation performed is equivalent to performing PC2 inverse, followed by the round rotate operation, followed by a PC2 forward permutation. As noted previously, the encoding for the round subkey places the 48 key bits used in the round operation at the left of the key register, and places the remaining 8 (unused) key bits at the right. The number of shifts is a function of the round: rounds 0, 1, 8, and 15—or 1, 2, 9, and 16 if numbering with round 1 as the first round—have one shift; the others have two. Thus, a different permutation operation or an extra permutation operation is used in rounds with two shifts. Optionally, additional reordering or randomizing of the key may be performed at this step. (If decrypting, this step can be performed after the S table lookups, or the PC1 permutation step will need to be adjusted to compensate for applying this permutation before the S lookups. Also, as noted, the PC2/rotate key permutation needs to incorporate a rotate to the right.).

Figure 2:
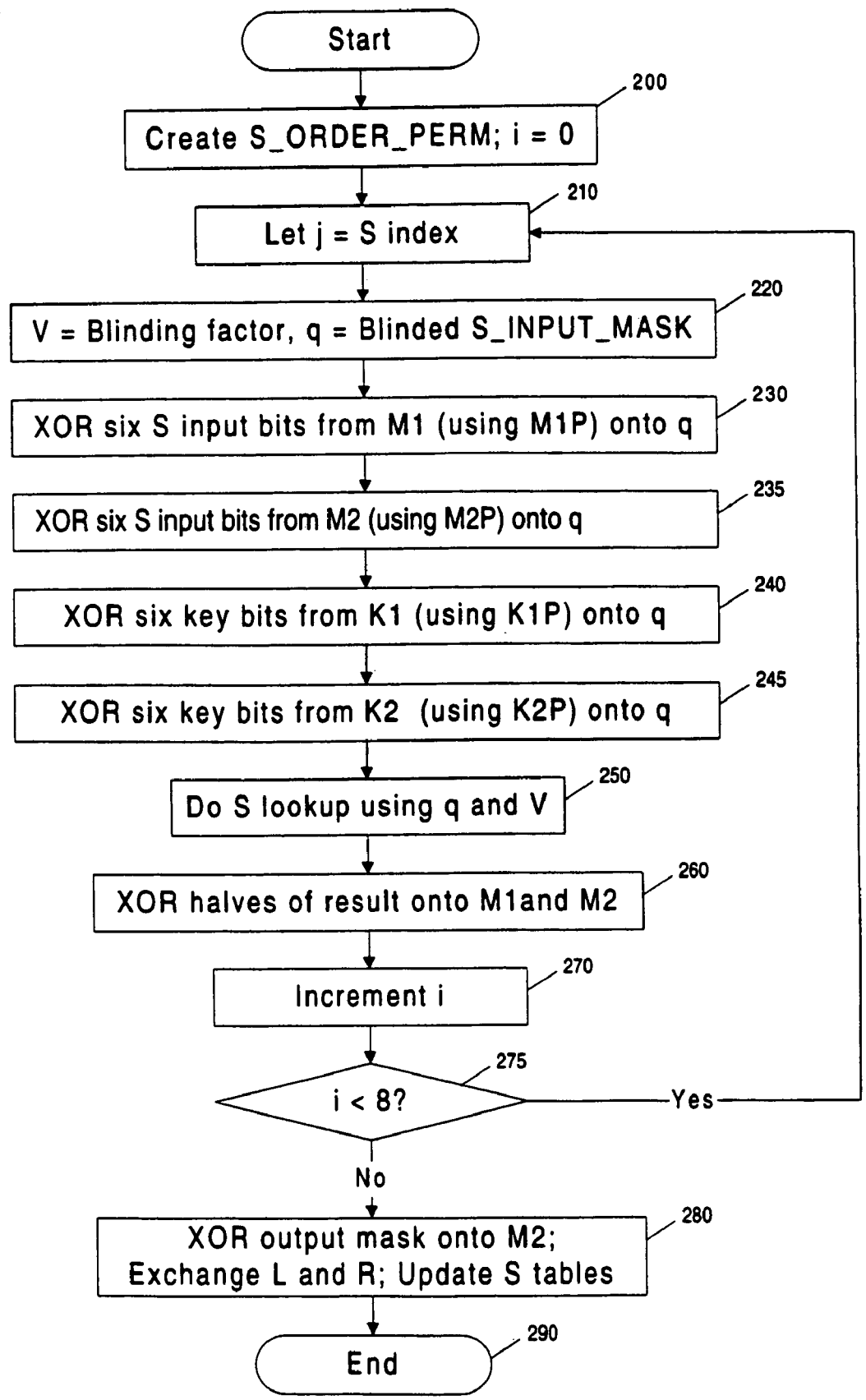
FIG. 2 details the S table lookups in each round of the leak-minimized DES method of FIG. 1

At step 145, the round operations are performed, as detailed in FIG. 2. Referring to FIG. 2, at step 200, the device produces a random S_ORDER_PERM[0 . . . 7] containing 8 elements with the values 0 . . . 7 in random order. Also, the loop counter i is initialized to zero. At step 210, j is set to the S table index for the next S lookup operation (e.g., j=S_ORDER_TABLE[S_ORDER_PERM[i]]).

At step 220, a random 6-bit mask V is obtained. Also at step 220, index register q is computed as the current S_INPUT_MASK value blinded by V (e.g., by computing q=V XOR S_INPUT_MASK[j]).

At step 230, using the permutation M1P for bit selection, the six input bits from M1 corresponding to the current S operation are extracted and XORed onto q. The six bit extraction and XOR operations are performed in random order. The selected bits correspond to the group of six bits selected by the E expansion operation for the current S index. Bits are placed in q in the order specified by S_INPUT_PERM[j]. Step 235 is similar to step 230, except that the appropriate six bits of M2 are selected using M2P.

At step 240, using the permutation K1P for bit selection, the six key bits input into the S operation are selected from K1. The six bit extraction and XOR operations are performed in random order. The selected bits correspond to the six key bits used in the current S operation of the current round. (If the key permutations performed previously at steps 120 and 140 of FIG. 1 place the round's PC2 permutation results as adjacent bits in M1P, then j is used as an index to the appropriate block of six bits in K1P.) Bits are placed in q in the order specified by S_INPUT_PERM[j]. Step 245 is similar to step 240, except that the appropriate six bits of K2 are selected using K2P.

At step 250, the S table lookup is performed by retrieving S_TABLE[j][q XOR V]. At step 260, for each of the 4 bits in the left half of the S table result, the device identifies the target location in M1 corresponding to the result of performing the S result permutation, the P permutation, and the M1P permutation. Each of the left 4 S result bits is permuted according to the first half of the elements in S_OUTPUT_ORDER[j] and XORed onto the corresponding M1 bit. (These permutations ultimately target the bit in M1 that corresponds to the appropriate destination bit in L.) The same is done to XOR the 4 bits in the right half of the S result onto M2 using M2P and the second half of S_OUTPUT_ORDER[j]. Optionally, the S table entry may be updated by XORing the left and right halves of the S table entry with a random 4-bit constant, permuted according to the inverse of the S_OUTPUT_ORDER permutations for the left and right half of the S result.

At step 270, the loop counter i is incremented. At step 275, i is checked to determine whether more of the round's 8 S table lookups need to be performed. If so, processing continues at step 210.

After the S table lookups have completed, at step 280 the value of S_OUTPUT_MASK is XORed onto M2 (of course, adjusted according to M2P). Also at step 280, the right and left halves of the data are exchanged in M1, M1P. Note that the exchange may be implemented as a bit permutation which, as described previously, can be accomplished by only changing M1P. Similarly, the left and right halves of M2, M2P are exchanged. Additional reordering or randomizing of the message, for example as described at step 110 of FIG. 1, is recommended at this point. Finally, updates to the S_TABLE are performed, as was described in the previous section, "Leak-Minimizing DES: Initialization and S Updates". At step 290, the process of FIG. 2 completes.

Referring back to FIG. 1, at step 150, the round counter is incremented. At step 155, the round counter value is checked to determine whether all 16 rounds have been completed. If rounds remain, processing continues at step 135.

After all rounds are complete, the final permutation is performed on the message at step 160. As described previously, the permutation operation can be applied by only manipulating the permutation tables themselves (M1P and M2P) and do not necessarily need to involve the data. Optionally, additional reordering or randomizing of the data may be performed. Finally, at step 170, the result contained in (M1, M2, M1P, M2P) is returned. If the result is non-secret (e.g., ciphertext), the standard DES ciphertext is produced by computing M1P{M1} XOR M2P{M2}.

During or between encryption (and decryption) operations, the S tables and associated parameters are updated. The rate and frequency at which updates are performed is a design parameter that depends on several factors. For example, table updates take time, particularly if the device's memory updates are slow, so less frequent table updates may be desirable for some high-performance implementations. The lifetime of the device's memory may also require that the update rate be limited. For example, EEPROM memories may fail if they are updated too many times. Also, devices with higher leakage rates may need to have their tables updated more often. For example, by using multiple redundant tables or splitting operands into more than two parts, effective leakage rates are reduced, and the table update rates can decrease. Finally, the device's security requirements can dictate the update frequency (e.g., more frequent updates can make attacks more difficult).

Because the DES key length is quite short (only 56 bits), DES is often strengthened using the triple DES construction, whereby three DES operations are performed on each data block. Leak minimizing triple DES may be implemented using three iterations of leak-minimizing single DES. Note that the two components comprising the first DES output may be used directly as the input to the second DES operation, and the second DES output components may be used directly as the input to the third DES operation. Also, the final permutation on the first and second DES operations is unnecessary if the initial permutation is omitted on the second and third DES operations.

Another alternate construction, DES-X, is known in the background art and is occasionally used as a way to strengthen DES against brute force attacks. DES-X involves XORing the plaintext with a 64-bit secret value (KX), using the normal DES algorithm with a secret DES key (KY) to encrypt the XOR result, and XORing the DES result with a third secret value (KZ). In an exemplary embodiment of DES-X according to the present invention, the XOR secrets (KX and KZ) can, for example, be stored as two components each (KX1, KX2 and KZ1, KZ2). Before the DES operation, KX1 is XORed onto one of the message halves (e.g., M1 with permutation through MP1) and KX2 onto the other. The DES operation is performed using a leak-minimizing implementation. After the DES operation, the message result halves are XORed with KZ1 and Kz2. To update a pair of XOR secret components (KX1 and KX2, or KZ1 and KZ2), a random number is produced and XORed onto both. Like other keys and messages, XOR key components can optionally have associated permutations.

Other Considerations

Cryptographic operations should normally be checked to ensure that incorrect computations do not compromise keys or enable other attacks. Cryptographic implementations of the present invention can be, and in a preferred embodiment of the invention are, combined with error-detection and/or error-correction logic to ensure that cryptographic operations are performed correctly. For example, a simple and effective technique is to perform cryptographic operations twice, ideally using two independent hardware processors and implementations, with a comparator to verify that both produce identical results. If the results produced by the two units do not match, the comparator will prevent the defective processing result from being used. In situations where security is more important than reliability, the comparator may make the device self-destruct if serious errors occur. For example, the comparator can cause a self-destruct if the two defective DES operations occur sequentially or once five defective DES results occur during the lifetime of the device. In some cryptosystems, redundancy is not necessary. For example, with RSA, self-checking functions can be incorporated into the cryptosystem implementation itself or verification can be performed after the operations.

Self-diagnostic functions such as a POST (power-on-self-test) should also be incorporated to verify that cryptographic functions have not been damaged. In some smartcards and other devices, the ATR (answer-to-reset) must be provided before a comprehensive self-test can be completed. In such cases, the self-test can be deferred until after completion of the first transaction or until a sufficient idle period. For example, a flag indicating successful POST completion can be cleared upon initialization. While the card is waiting for a command from the host system, it can attempt the POST. Any I/O received during the POST will cause an interrupt, which will cancel the POST (leaving the POST-completed flag at zero). If any cryptographic function is called, the device will check the POST flag and (if it is not set) perform the POST first.

CONCLUSIONS

Many variations and adaptations of the invention are possible. For example, the message bits can be stored in 128-bit arrays where the bits are intermingled (as opposed to having separated halves), keys can be manipulated in 64-bit form instead of 56-bit form, orderings can be reversed or permuted (including in ways that do not change the final result of the computation). Rather than blinding operations with XOR halves, other bit operations can be applied. Where basic operations other than XOR bit operations are used, other splitting and/or blinding functions can be used. To save memory, permutation tables can be eliminated while maintaining randomness in table orders by encoding tables such that XORing with a mask (or applying another index unmasking function) yields the final pointer to the data. Rather than splitting data into only two halves, three or more subvalues can be used. Additional tables (whose inputs serve as pointers to further tables, or whose outputs are combined, or both) can be used for additional security. In optimized hardware implementations, it might be necessary to limit the amount of system state information, so simplified versions of the algorithm can be implemented. For example, rather than maintaining full permutation tables, it is possible to permute the order by applying a parameter-based function to the input. For example, in an exemplary permutation operation, the output bit location is found by XORing the input location register by a first constant, then adding the value of a second constant. (For a 6-bit index, only 12 register bits are required to encode the permutation, as opposed to $(2^6)(64)=4096$ for a regular permutation.) In hardware implementations where individual operations in an integrated circuit or other module are considered to be secure, the invention may still be applied for securing secret messages and keys communicated between the circuit (or module) and other parts of the system.

Further, although the invention has been described in the context of permuting both keys and messages, each into two sub-parts, those skilled in the art will appreciate that either or both (as well as other secret quantities) could be permuted, into a plurality of parts greater than two. Finally, although the invention has been described with respect to DES, the invention can be applied to and adapted to other cryptographic symmetric algorithms, including without limitation Blowfish, SEAL, IDEA, SHA, RC5, TEA, and other cryptographic algorithms involving operations suitable for application of the techniques of this invention. In all such cases, including DES, the term "plaintext" as used herein shall be understood to refer to the quantity that is in plaintext form relative to whatever cryptographic protocol is being used (e.g., DES). Thus, a "plaintext" quantity could actually be encrypted using some other algorithm and still be within the meaning of plaintext relative to the cryptographic protocol under consideration.

The invention therefore encompasses a wide variety of related techniques that enable the construction of devices that are significantly more resistant to attack than devices of similar cost and complexity that do not use the invention. In addition, multiple security techniques may be required to make a system secure; and leak minimization may be used in conjunction with other security methods or countermeasures.

As those skilled in the art will appreciate, the techniques described above are not limited to particular host environments or form factors. Rather, they may be used in a wide variety of applications, including without limitation: cryptographic smartcards of all kinds including without limitation smartcards substantially compliant with ISO 7816-1, ISO 7816-2, and ISO 7816-3 ("ISO 7816-compliant smartcards"); contactless and proximity-based smartcards and cryptographic tokens; stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; intellectual property protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems.

All of the foregoing illustrates exemplary embodiments and applications of the invention, from which related variations, enhancements and modifications will be apparent without departing from the spirit and scope of the invention. Therefore, the invention should not be limited to the foregoing disclosure, but rather construed by the claims appended hereto.

What is claimed is:

1. An improved method for performing a symmetric block cipher operation on a message block using a tamper resistant device having a microprocessor, the improved method comprising:
    (a) receiving an input message;
    (b) obtaining unpredictable information;
    (c) using said microprocessor, producing at least one masked intermediate parameter and a corresponding blinding parameter from at least said input message and said unpredictable information, such that:
        (i) the value of said masked intermediate parameter is unpredictable to an attacker;
        (ii) the value of said blinding parameter is unpredictable to an attacker;

(iii) the value of an intermediate value for said block cipher operation is represented by a mathematical relationship between said masked intermediate parameter and said blinding parameter;

(d) using said microprocessor, performing a plurality of rounds of said block cipher operation, where each said round includes changing said value for at least one of said parameters, and at least one round includes (x) obtaining additional unpredictable information relative to a prior round, and (y) using said additional unpredictable information, processing said masked intermediate parameter and said blinding parameter to obtain a new value for said masked intermediate parameter and a new value for said blinding parameter relative to a prior round; and (e) producing an output message from at least said masked intermediate parameter and said blinding parameter after said round operations in step (d).

2. The method of claim 1 where said block cipher operation is compatible with the Data Encryption Standard.

3. The method of claim 1, where:

(i) a first intermediate value corresponds to a mathematical relationship between the masked intermediate parameter and blinding factor; and (ii) a second intermediate value corresponds to said mathematical relationship between said new value for said masked intermediate parameter and said new value for said blinding factor.

4. The method of claim 3, where said second intermediate value is equal to said first intermediate value.

5. An improved tamper resistant device containing means for performing a symmetric block cipher operation on a message block, the improved tamper resistant device comprising:

(a) means for receiving an input message;

(b) a source of unpredictable information;

(c) means for producing at least one masked intermediate parameter and a corresponding blinding parameter from at least an input message and unpredictable information, such that:

(i) the value of said masked intermediate parameter is unpredictable to an attacker;

(ii) the value of said blinding parameter is unpredictable to an attacker;

(iii) the value of an intermediate value for said block cipher operation is represented by a mathematical relationship between said masked intermediate parameter and said blinding parameter;

(d) means for performing a plurality of rounds of said block cipher operation, including changing said value for at least one of said parameters, and wherein at least one round includes (x) obtaining additional unpredictable information relative to a prior round, and (y) using said additional unpredictable information, processing said masked intermediate parameter and said blinding parameter to obtain a new value for said masked intermediate parameter and a new value for said blinding parameter relative to a prior round; and (e) means for producing an output message, from at least said masked intermediate parameter and said blinding parameter, incorporating the result of said round in (d).

6. The device of claim 5 where said block cipher operation is compatible with the Data Encryption Standard.

7. The device of claim 5 where said intermediate value is predictable to an attacker.

8. The device of claim 5, where:

(i) a first intermediate value corresponds to a mathematical relationship between the masked intermediate parameter and blinding factor; and (ii) a second intermediate value corresponds to said mathematical relationship between said new value for said masked intermediate parameter and said new value for said blinding factor.

9. The device of claim 8, where said second intermediate value is equal to said first intermediate value.

10. The method of claim 1 where said intermediate value is predictable to an attacker.

* * * * *